(12) United States Patent
Inatomi et al.

(10) Patent No.: US 7,683,155 B2
(45) Date of Patent: *Mar. 23, 2010

(54) PROCESS FOR PRODUCING PHENOLIC NOVOLAK

(75) Inventors: Shigeki Inatomi, Aichi (JP); Noboru Tanoue, Aichi (JP); Motoji Yokoyama, Aichi (JP); Hirofumi Shinohara, Aichi (JP); Satoshi Takehara, Aichi (JP)

(73) Assignee: Asahi Organic Chemicals Industry Col., Ltd., Nobeoka-shi (JP)

( * ) Notice: Subject to any disclaimer, the term of this patent is extended or adjusted under 35 U.S.C. 154(b) by 519 days.

This patent is subject to a terminal disclaimer.

(21) Appl. No.: 10/524,636

(22) PCT Filed: Aug. 29, 2003

(86) PCT No.: PCT/JP03/11045

§ 371 (c)(1), (2), (4) Date: Apr. 25, 2006

(87) PCT Pub. No.: WO2004/020492

PCT Pub. Date: Mar. 11, 2004

(65) Prior Publication Data
US 2006/0241276 A1    Oct. 26, 2006

(30) Foreign Application Priority Data

| Aug. 30, 2002 | (JP) | 2002-252882 |
| Aug. 30, 2002 | (JP) | 2002-252883 |
| Aug. 30, 2002 | (JP) | 2002-252884 |
| Sep. 19, 2002 | (JP) | 2002-273027 |
| Dec. 17, 2002 | (JP) | 2002-364568 |
| Dec. 19, 2002 | (JP) | 2002-367487 |
| Dec. 26, 2002 | (JP) | 2002-376935 |
| Jun. 11, 2003 | (JP) | 2003-166102 |
| Jul. 15, 2003 | (JP) | 2003-196946 |

(51) Int. Cl.
C08G 8/02 (2006.01)
C08G 8/04 (2006.01)
C08G 14/02 (2006.01)

(52) U.S. Cl. ............... 528/142; 528/129; 528/128; 528/141

(58) Field of Classification Search ............ 528/129, 528/128, 142
See application file for complete search history.

(56) References Cited

U.S. PATENT DOCUMENTS 3,244,671 A * 4/1966 Shepard .................. 525/534
4,010,163 A * 3/1977 Hesse et al. ............ 524/596

(Continued)

FOREIGN PATENT DOCUMENTS

DE    2616992    11/1977

(Continued)

OTHER PUBLICATIONS

Supplementary European Search Report dated Feb. 9, 2007 for EP 03 79 1416.

*Primary Examiner*—Mark Eashoo
*Assistant Examiner*—Liam J Heincer
(74) *Attorney, Agent, or Firm*—Edwards Angell Palmer & Dodge LLP

(57) ABSTRACT

A phenolic novolak having the contents of a monomeric phenol and a dimeric phenol and a degree of dispersion controlled can be obtained in high yield by a process for production of a phenolic novolak having a step of conducting a heterogeneous reaction of a phenol and an aldehyde in the presence of a phosphoric acid and an unreactive oxygen-containing organic solvent as a reaction cosolvent.

6 Claims, 14 Drawing Sheets

U.S. PATENT DOCUMENTS

| | | | |
|---|---|---|---|
| 4,345,054 A * | 8/1982 | Takeda et al. | 525/480 |
| 4,876,324 A | 10/1989 | Nakano et al. | |
| 5,115,074 A * | 5/1992 | Umetani et al. | 528/98 |
| 5,118,875 A * | 6/1992 | Martella et al. | 568/727 |
| 5,151,496 A * | 9/1992 | Bertram et al. | 528/500 |
| 5,314,986 A * | 5/1994 | Ooms et al. | 528/219 |
| 5,371,169 A * | 12/1994 | Lu et al. | 528/155 |
| 5,380,800 A * | 1/1995 | Bender et al. | 525/133.5 |
| 5,470,924 A * | 11/1995 | Ryan | 525/501 |
| 5,473,045 A * | 12/1995 | Sizensky et al. | 528/129 |
| 5,571,886 A * | 11/1996 | Zampini | 528/143 |
| 5,859,153 A * | 1/1999 | Kirk et al. | 525/481 |
| 5,939,511 A * | 8/1999 | Zampini et al. | 528/143 |
| 6,316,583 B1 * | 11/2001 | Gerber | 528/245 |
| 6,730,769 B2 | 5/2004 | Katano et al. | 528/129 |
| 6,936,680 B2 * | 8/2005 | Saito et al. | 528/129 |
| 7,241,833 B2 * | 7/2007 | Inatomi et al. | 524/541 |
| 2001/0024762 A1 | 9/2001 | Miyagi et al. | |
| 2002/0091224 A1 * | 7/2002 | Saito et al. | 528/129 |
| 2003/0065126 A1 * | 4/2003 | Katano et al. | 528/129 |
| 2004/0167312 A1 * | 8/2004 | Miyagi et al. | 528/129 |
| 2005/0075452 A1 * | 4/2005 | Inatomi et al. | 524/800 |
| 2005/0124778 A1 * | 6/2005 | Saito et al. | 528/129 |
| 2007/0299163 A1 * | 12/2007 | Hwang et al. | 523/400 |

FOREIGN PATENT DOCUMENTS

| | | |
|---|---|---|
| EP | 0224911 | 6/1987 |
| EP | 0559204 | 9/1993 |
| JP | 60-260611 | 12/1985 |
| JP | 61-98717 | 5/1986 |
| JP | 62-230816 | 10/1987 |
| JP | 5-178951 | 7/1993 |
| JP | 2002-105157 | 4/2002 |
| JP | 2002-179749 | 6/2002 |
| WO | WO 9960043 A1 * | 11/1999 |
| WO | WO03042267 A1 * | 5/2003 |

* cited by examiner

PROCESS FOR PRODUCING PHENOLIC NOVOLAK

TECHNICAL FIELD

The present invention relates to a process for production of a phenolic novolak, and more particularly to a production process capable of producing a phenolic novolak having the contents of a monomeric phenol and a dimeric phenol and a degree of dispersion (Mw/Mn) controlled in high yield.

BACKGROUND ART

Conventionally, the phenolic novolak is generally produced by switching from a homogeneous reaction of a phenol and an aldehyde in the presence of an acid catalyst to a heterogeneous reaction starting from an emulsification phenomenon, further pursuing the reaction, checking the production of an initial condensate having a desired degree of condensation before terminating the condensation reaction, and conducting the reduction of low-molecular-weight components and dehydration in the initial condensate by vacuum concentration. And, the phenolic novolak has relatively favorable electric properties and also excels in heat resistance and flame retardance. Therefore, it is extensively used as a base resin for an epoxy resin which is used for, for example, electric and electronic materials, semiconductor sealers and the like required to have remarkable electric properties or a curing agent for epoxy resins, a base resin for a photoresist to be used for LCDs and semiconductors and also used as a binder for laminated plates, forming materials, mold materials, and the like.

But, when the conventional phenolic novolak was used for the electric and electronic materials, semiconductor sealers or the like, the resin contained a monomeric phenol and a dimeric phenol in a large amount, so that there were various problems such as environmental pollution because of volatilization of the monomeric phenol involving an odor, a degradation in production efficiency because of falling of the dimeric phenol, which were sublimated to deposit on the side and ceiling of the apparatus when a photoresist coated on a substrate such as glass for liquid crystal display was baked, onto the substrate, and a degradation in crosslinking density of a cured resin substance affecting on the heat resistance, and the like. Because the molecular weight distribution was broad, there were also disadvantages that the molten resin had a high viscosity and poor moldability.

Where the phenolic novolak is used as a binder for castings, it is demanded to decrease phenol monomer contained in the phenolic resin as low as possible because the phenol monomer applies to the PRTR law (Pollutant Release and Transfer Register) and the phenol monomer contained in the binder becomes tar in a high-temperature atmosphere, resulting in defective casting such as a gas defect. In other words, as the phenolic resin for the casting binder, a phenolic novolak having properties that a content of monomeric phenol is decreased, a molecular weight is low and the molecular weight distribution is narrow is demanded.

For example, as a method for reduction of the monomeric phenol and dimeric phenol contained in the above phenolic resin, there is proposed a method of removing low-molecular weight components by blowing in inert gas or vapor to condense a novolak-based condensate at 150° C. to 210° C. after the condensation reaction is completed (Japanese Patent Publication No. Hei 7-91352). This method has a reliable effect of decreasing the monomeric phenol and dimeric phenol but has a disadvantage that their removal lowers the yield of the resin.

The present invention has been made in view of the above circumstances and provides a process for production capable of producing a phenolic novolak with the contents of a monomeric phenol and a dimeric phenol and a degree of dispersion (Mw/Mn) controlled in high yield by reacting a phenol and an aldehyde in the presence of a phosphoric acid and a reaction cosolvent.

SUMMARY OF THE INVENTION

The process for production of a phenolic novolak of the present invention comprises a step of conducting a heterogeneous reaction of a phenol with an aldehyde in the presence of a phosphoric acid and an unreactive oxygen-containing organic solvent as a reaction cosolvent.

Here, the compounding amount of the phosphoric acid is preferably 5 parts by mass or more per 100 parts by mass of the phenol and more preferably 25 parts by mass or more, the compounding amount of the reaction cosolvent is preferably 5 parts by mass or more to 100 parts by mass of the phenol, and more preferably 10 to 200 parts by mass, and a ratio of the phenol and the aldehyde is preferably 0.40 to 1.0 mol of the aldehyde per mol of the phenol.

As the reaction cosolvent, it is preferable to use at least one selected from the group consisting of an alcohol, a polyalcohol-based ether, a cyclic ether, a polyalcohol-based ester, a ketone and a sulfoxide.

And, it is also preferable to have a surface active agent in the step of conducting the heterogeneous reaction.

It is also preferable to conduct the step of the heterogeneous reaction under pressure of 0.03 to 1.50 MPa.

BEST MODE FOR CARRYING OUT THE INVENTION

Figure 1:
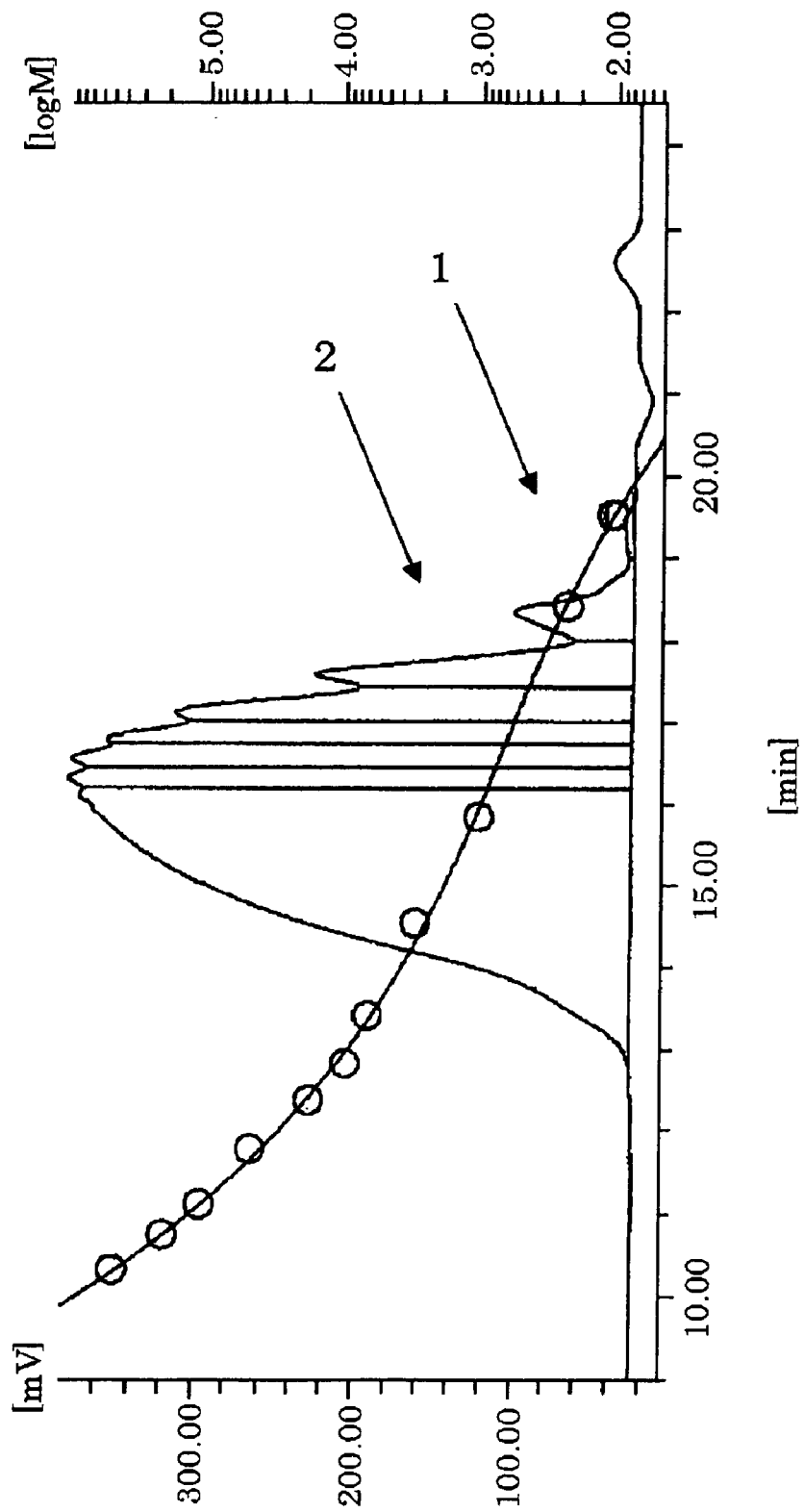
FIG. 1 is a gel permeation chromatography (hereinafter might be referred to as the "GPC") chart of a phenolic novolak (hereinafter might be referred to as the "novolak resin") obtained in Example 1.

A process for production of the phenolic novolak according to the present invention has a step which requires a phenol and an aldehyde as raw materials, a phosphoric acid as an acid catalyst, and an unreactive oxygen-containing organic solvent as a reaction cosolvent, stirs to mix them in a two-phase separated state by, for example, mechanical stirring, ultrasonic wave or the like, and pursues a reaction between the phenol and the aldehyde in a cloudy heterogeneous reaction system with the two phases (organic phase and water phase) mixed to synthesize a condensate (resin).

Then, for example, a water-insoluble organic solvent (e.g., methyl ethyl ketone, methyl isobutyl ketone or the like) is added and mixed to dissolve the condensate, the stirring for mixing is stopped, and the mixture is left standing to separate into the organic phase (organic solvent phase) and the water phase (aqueous phosphoric acid solution phase). Then, the water phase is removed for recovering, while the organic phase is washed with hot water and/or neutralized and recovered by distillation. Thus, the novolak resin can be produced.

The process for production according to the invention employs a phase separation reaction, so that stirring efficiency is quite important, and it is desirable to miniaturize both phases in the reaction system to increase the surface area of the interface as large as possible in view of the reaction efficiency, and the conversion of the monomeric phenol into the resin is promoted.

Examples of the phenol used as the raw material are phenol, orthocresol, metacresol, paracresol, xylenol, a bisphenol, an orthosubstituted phenol having a hydrocarbon radial containing 3 or more carbon atoms, preferably 3 to 10 carbon atoms, in the ortho-position, a parasubstituted phenol having a hydrocarbon radial containing 3 or more carbon atoms, preferably 3 to 18 carbon atoms, in the para-position, and the like.

Here, examples of the bisphenol are bisphenol A, bisphenol F, bis(2-methyl phenol)A, bis(2-methyl phenol)F, bisphenol S, bisphenol E, bisphenol Z and the like.

Examples of the orthosubstituted phenol are 2-propylphenol, 2-isopropylphenol, 2-sec-butylphenol, 2-tert-butylphenol, 2-phenylphenol, 2-cyclohexylphenol, 2-nonyl phenol, 2-naphthyl phenol and the like. Especially, 2-phenylphenol, 2-tert-butylphenol, 2-cyclohexylphenol are suitably used in the field of the epoxy resin.

Examples of the parasubstituted phenol are 4-propylphenol, 4-isopropylphenol, 4-sec-butylphenol, 4-tert-butylphenol, 4-phenylphenol, 4-cyclohexylphenol, 4-nonyl phenol, 4-naphthyl phenol, 4-dodecylphenol, 4-octadecylphenol and the like.

Meanwhile, examples of the aldehyde are formic aldehyde, formalin, paraformaldehyde, trioxane, acetic aldehyde, paraaldehyde, propionaldehyde and the like. Among them, the paraformaldehyde is desirable in view of a reaction velocity.

Those raw materials are not limited to the exemplified ones and can be used alone or as a combination of two or more of them.

A compounding mole ratio (F/P) of the aldehyde (F) and the phenol (P) is 0.33 or more, preferably 0.41 to 1.0, and more preferably 0.50 to 0.90. If it is less than 0.33, there is a possibility that the effect of improving the yield is degraded.

The phosphoric acid used as the acid catalyst plays an important role to form a place for a phase separation reaction with the phenol in the presence of water. Preferably, an aqueous solution type, e.g., 89% by mass phosphoric acid or 75% by mass phosphoric acid, is used but, for example, polyphosphoric acid or anhydrous phosphoric acid may be used if necessary.

The compounding amount of the phosphoric acid has a considerable effect on the control of the phase separation effect and it is generally 5 parts by mass or more, preferably 25 parts by mass or more, and more preferably 50 to 100 parts by mass, per 100 parts by mass of the phenol. Where 70 parts by mass or more of phosphoric acid is used, it is desirable to secure safety by suppressing heat generation in the early stage of reaction by split-charging to the reaction system.

The unreactive oxygen-containing organic solvent as the reaction cosolvent plays a very important role to promote the phase separation reaction. As the reaction cosolvent, it is desirable to use at least one member selected from a group consisting of an alcohol, a polyalcohol-based ether, a cyclic ether, a polyalcohol-based ester, a ketone and a sulfoxide.

Examples of the alcohol are monohydric alcohol such as methanol, ethanol or propanol, dihydric alcohol such as butanediol, pentanediol, hexanediol, ethylene glycol, propylene glycol, trimethylene glycol, diethylene glycol, dipropylene glycol, triethylene glycol, tripropylene glycol or polyethylene glycol, trihydric alcohol such as glycerin, and the like.

Examples of the polyalcohol-based ether are ethylene glycol monomethyl ether, ethylene glycol monoethyl ether, ethylene glycol monopropyl ether, ethylene glycol monobutyl ether, ethylene glycol monopentyl ether, ethylene glycol dimethyl ether, ethylene glycol ethylmethyl ether, ethylene glycol ether and the like.

Examples of the cyclic ether are 1,3-dioxane, 1,4-dioxane and the like, examples of the polyalcohol-based ether are glycol esters such as ethylene glycol acetate, examples of the ketones are acetone, methyl ethyl ketone, methyl isobutyl ketone and the like, and examples of the sulfoxide are dimethyl sulfoxide, diethyl sulfoxide and the like.

Among them, ethylene glycol monomethyl ether, polyethylene glycol and 1,4-dioxane are particularly desirable.

The reaction cosolvents are not limited to the above-described examples but solid types can also be used if they have the above-described properties and are in a state of liquid at the time of the reaction. And, they can be used alone or as a combination of two or more.

The reaction cosolvent is not limited to a particular blending amount but used in 5 parts by mass or more, and preferably 10 to 200 parts by mass, per 100 parts by mass of phenol.

And, by additional used of a surface active agent in the heterogeneous reaction step, the phase separation reaction is promoted, the reaction time can be reduced, and the yield can also be improved.

Examples of the surface active agent are anionic surface active agents such as soap, alpha olefin sulfonate, alkylbenzene sulfonic acid and its salt, alkyl sulfate, alkyl ether sulfate, phenyl ether ester salt, polyoxyethylene alkylether sulfate, ether sulfonate and ether carboxylate; nonionic surface active agents such as polyoxyethylene alkyl phenyl ether, polyoxyalkylene alkylether, polyoxyethylene styrenated phenol ether, polyoxyethylene alkylamino ether, polyethylene glycol aliphatic ester, aliphatic monoglyceride, sorbitan aliphatic ester, pentaerythtol aliphatic ester, polyoxyethylene polypropylene glycol and aliphatic alkyrol amide; and cationic surface active agents such as monoalkyl ammonium chloride, dialkyl ammonium chloride and an amino-acid salt.

The compounding amount of the surface active agent is not limited to a particular amount but 0.5 part or more per 100 parts by mass of a phenol, and preferably 1 to 10 parts by mass.

An amount of water in the reaction system has an effect on a phase separation effect and a production efficiency but is generally 40% or less according to the mass standard. If the amount of water exceeds 40%, there is a possibility that the production efficiency decreases.

A reaction temperature between the phenol and the aldehyde is variable depending on types of phenols and reaction conditions, and not limited particularly but generally 40° C. or more, preferably 80° C. to a reflux temperature, and more preferably a reflux temperature. If the reaction temperature is less than 40° C., the reaction time becomes very long, and the phenol monomer cannot be reduced easily. The reaction time is variable depending on the reaction temperature, blending amount of phosphoric acid, a water content in the reaction system and the like but generally about 1 to 10 hours.

As a reaction environment, it is general to have normal pressure, but the reaction may be made under pressure or under a reduced pressure if the heterogeneous reaction which is a feature of the present invention is maintained. Particularly, under pressure of 0.03 to 1.50 MPa, a reaction velocity can be increased, and a low-boiling solvent such as methanol can be used as a reaction cosolvent.

When the process for production of the present invention is used, the following phenolic novolaks are generally obtained in the compounding mole ratio (F/P) of an aldehyde (F) and a phenol (P) though variable to some extent depending on types of phenols.

When the compounding mole ratio (F/P) is 0.80 mol or more, and preferably in a range of 0.80 mol or more and 1.00 mol or less, phenolic novolak can be produced in high yield in that a total content of a monomeric phenol and a dimeric phenol is 10% or less, and preferably 5% or less according to the measurement made by the GPC area method, and the degree of dispersion (Mw/Mn) of the weight-average molecular weight (Mw) and the number-average molecular weight (Mn) is 1.1 to 3.0, preferably 1.2 to 2.0, according to GPC measurement.

When the compounding mole ratio (F/P) is in a range of 0.33 or more and less than 0.80, phenolic novolak can be produced in high yield in that in that a monomeric phenol content is 3% or less, preferably 1% or less, and a dimeric phenol content is 5% to 95%, preferably 10% to 90% when measured by the GPC area method, and the degree of dispersion (Mw/Mn) of the weight-average molecular weight (Mw) and the number-average molecular weight (Mn) is 1.05 to 1.8, preferably 1.1 to 1.7, according to GPC measurement.

It is not necessarily clear why the novolak resin is obtained in good yield with the contents of the monomeric phenol and dimeric phenol and the degree of dispersion (Mw/Mn) controlled according to the process for production of the invention but it is presumed as follows.

In the heterogeneous reaction system in a cloudy state that the organic phase having the phenol as the main ingredient and the water phase having the phosphoric acid, the aldehyde and a reaction cosolvent as the main ingredients are mixed, the phenol in the organic phase dissolves into the water phase by the dissolution promoting action of the reaction cosolvent and reacts with the aldehyde under the catalyzing conditions of the phosphoric aid to grow as a condensate resin), which cannot coexist in the water phase and moves to the organic phase having condensate dissolving power, and the further growth of the condensate is suppressed or stopped, so that it is prevented from being of high molecular weight. Thus, the process of the invention applies a two-liquid phase interface reaction having a mechanism of the resinification of the phenol in the water phase and suppressing the resin from being of high molecular weigh in the organic phase, so that it is assumed that the resin having the contents of the monomeric phenol and dimeric phenol and a degree of dispersion (Mw/Mn) controlled is produced at the end of the condensation reaction, and the yield is considerably improved.

It is considered from the above that the setting of the compounding ratio of the reaction raw materials and the compounding amount of phosphoric acid and reaction cosolvent is most significant but water and reaction temperatures essential for the phase separation related to the above are also important to efficiently develop the phase separation effect of the process according to the invention. In other words, the process according to the invention is presumed that the novolak resin having the contents of the monomeric phenol and the dimeric phenol and the degree of dispersion (Mw/Mn) controlled by setting the appropriate reaction conditions according to the above-described presumed reasons can be produced in high yield.

EXAMPLES

Then, the present invention will be described in further detail in examples but not limited to such examples. The properties of the produced novolak resin were measured by the following testing methods.

(1) Degree of Dispersion

Weight-average molecular weight (Mw) and number-average molecular weight (Mn) in terms of the standard polystyrene calibration were determined by Tosoh Corporation's gel permeation chromatography SC-8020 series build-up system (column: G2000Hxl+G4000Hxl , detector: UV 254 nm, carrier: tetrahydrofuran 1 ml/min, column temperature: 38° C.), and a degree of dispersion (Mw/Mn) was calculated.

(2) Contents (%) of Monomeric Phenol and Dimeric Phenol

Areas of a monomeric phenol and a dimeric phenol to the entire area of the molecular weight distribution were measured by an area method indicating in percentage.

(3) Softening Point

According to the Ring-and-Ball method described in JIS-K6910, a ring-and-ball type automatic softening point measuring apparatus ASP-MGK2 produced by MEITECH Company, Ltd. was used for measurement.

(4) Melt Viscosity

Measured by a cone plate viscometer (CONE PLATE VISCOMETER MODEL CV-1 produced by TOA Industry Inc.).

(5) Alkali Dissolving Velocity (Å/s)

Novolak resin was dissolved in ethyl cellosolve acetate, the obtained solution was coated on a silicon wafer by a spin coater, and prebaking was conducted to form a novolak resin film having a thickness of about 15000 Å. It was immersed in an alkali developing solution (2.38% by mass aqueous tetramethyl ammonium hydroxide solution) at 23° C., time until the film disappeared was measured to determine a thickness dissolved per second (Å/s), and it was determined as an alkali dissolving velocity.

(6) Epoxy Equivalent (g/eq)

Measured according to JIS-K-7236 (indicator titration method/titration by 0.1N perchloric acid, acetic acid solution).

Example 1

Into a reaction vessel provided with a thermometer, a stirring device and a condenser, 193 parts of phenol (P), 57 parts of 92% by mass paraformaldehyde (F) (F/P=0.85), 116 parts of 89% by mass phosphoric acid (53.4%/P), 96.5 parts of ethylene glycol (50%/P) were charged and gradually raised to a reflux temperature (98 to 102° C.) in a cloudy condition (two-phase mixture) formed by stirring for mixing, and at the same temperature, a condensation reaction was conducted for ten hours, then the reaction was stopped.

Then, methyl isobutyl ketone was added to dissolve the condensate while stirring for mixing, the stirring for mixing was stopped, the content was moved into a separating flask and left standing to separate into a methyl isobutyl ketone solution layer (upper layer) and an aqueous phosphoric acid solution layer (lower layer) Then, the aqueous phosphoric acid solution layer was removed, the methyl isobutyl ketone solution was washed with water several times to remove phosphoric acid, the content was returned into the reaction vessel, and the methyl isobutyl ketone was completely removed by vacuum distillation to obtain 213.5 parts of the novolak resin (yield 110.6%/P). The yield of the novolak resin was indicated in percentage with respect to the charged amount of phenol (mass standard).

The obtained novolak resin was measured for its properties according to the testing method described above. The results are shown in Table 1. A GPC chart of the obtained novolak resin is shown in FIG. 1.

Examples 2 to 7

Novolak resins were obtained in the same manner as in Example 1 except that the reaction conditions were changed as shown in Table 1. The measured results are shown in Table 1. In Table 1, "N.D." indicates no detection.

TABLE 1

| | | | Example | | | | | | |
|---|---|---|---|---|---|---|---|---|---|
| | | | 1 | 2 | 3 | 4 | 5 | 6 | 7 |
| Reaction conditions [Mass std.] | Raw material | Phenol | 193 | 193 | 193 | 193 | 193 | 193 | 193 |
| | | 92% Paraform | 57 | 57 | 57 | 57 | — | 47 | 33.5 |
| | | 37% Formalin | — | — | — | — | 142 | — | — |
| | | Compounding ratio (F/P)(mole ratio) | 0.85 | 0.85 | 0.85 | 0.85 | 0.85 | 0.75 | 0.5 |
| | Catalyst | 89% Phosphoric acid solution | 116 | 116 | 116 | 116 | 116 | 116 | 116 |
| | | Compounding amount of phosphoric acid (Pure content)(%/P) | 60 | 60 | 60 | 60 | 60 | 60 | 60 |
| | Cosolvent | Ethylene glycol | 96.5 | — | — | — | — | — | — |
| | | 1,4-Dioxane | — | 96.5 | — | — | 96.5 | — | 19.3 |
| | | 1,4-Butanediol | — | — | 96.5 | — | — | 38.6 | — |
| | | Methanol | — | — | — | 11.4 | — | — | — |
| | | Usage (%/P) | 50 | 50 | 50 | 5.9 | 50 | 20 | 10 |
| | Reaction time (hour) | | 10 | 10 | 9 | 11.5 | 10 | 7 | 7 |
| Resin properties | Monomeric phenol (%) | | 0.3 | N.D. | N.D. | 0.4 | N.D. | N.D. | N.D. |
| | Dimeric phenol (%) | | 3.3 | 2.3 | 3.1 | 1.3 | 4.7 | 16.3 | 50.1 |
| | Number-average molecular weight (Mn) | | 755 | 776 | 780 | 688 | 928 | 390 | 378 |
| | Weight-average molecular weight (Mw) | | 1227 | 1110 | 1213 | 1035 | 1551 | 548 | 464 |
| | Degree of dispersion (Mw/Mn) | | 1.63 | 1.43 | 1.55 | 1.5 | 1.67 | 1.4 | 1.23 |
| | Melt viscosity (Pa·s/150° C.) | | 3.13 | 2.31 | 3.46 | 3.34 | 2.47 | 0.03 | 0.04 |
| | Softening point (° C.) | | 107.3 | 108.5 | 113.3 | 111 | 106.9 | 81.4 | 50.1 |
| | Yield (%) | | 110.6 | 106.6 | 105.6 | 107.6 | 109.7 | 107.2 | 82.8 |

Examples 8 to 18

Figure 2:
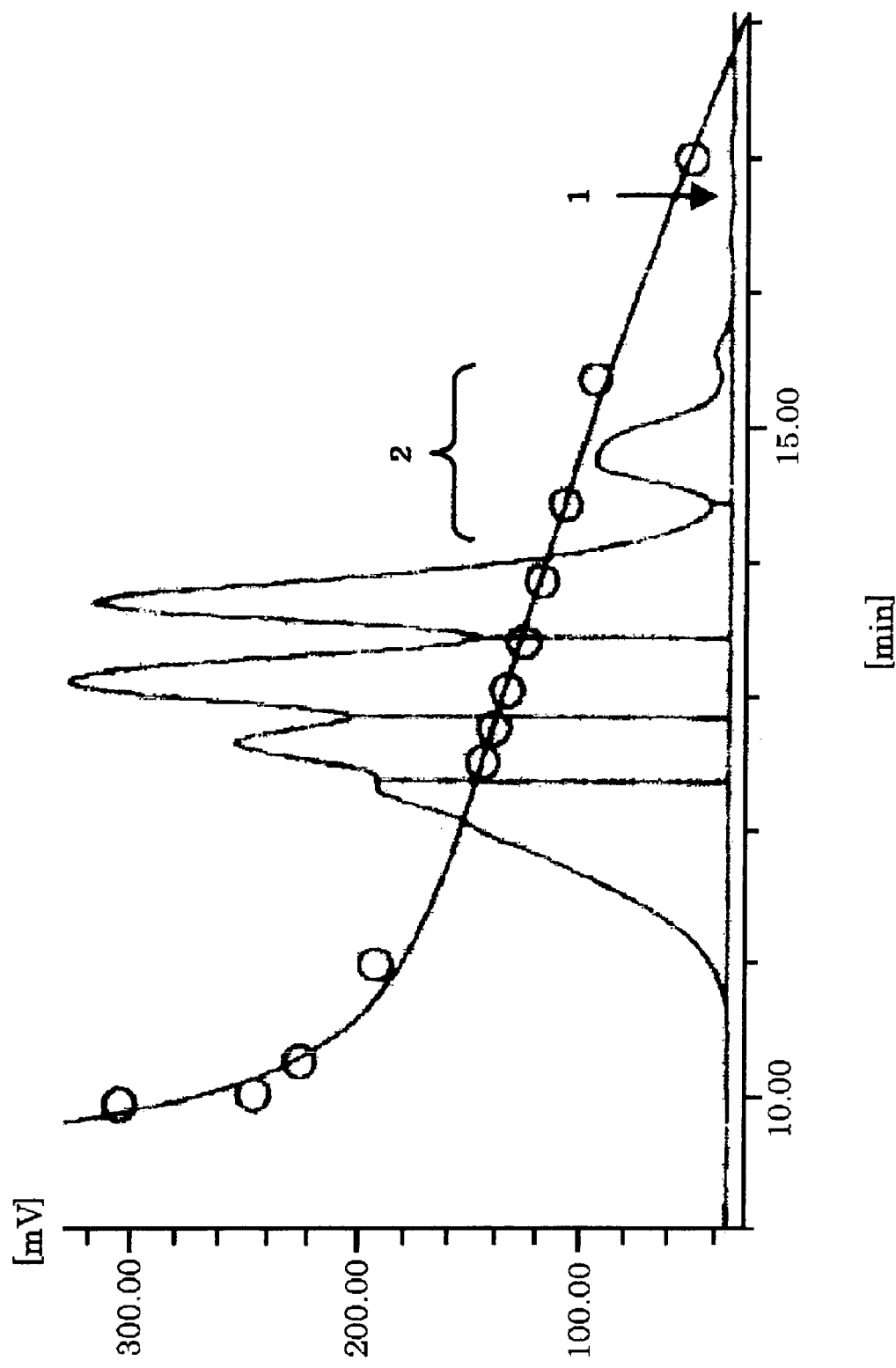
FIG. 2 is a GPC chart of the novolak resin obtained in Example 14.

Novolak resins were obtained in the same manner as in Example 1 except that the reaction conditions were changed as shown in Table 2. The measured results are shown in Table 2. A GPC chart of the novolak resin obtained in Example 14 is shown in FIG. 2.

TABLE 2

| | | | Example | | | | | | | | | | |
|---|---|---|---|---|---|---|---|---|---|---|---|---|---|
| | | | 8 | 9 | 10 | 11 | 12 | 13 | 14 | 15 | 16 | 17 | 18 |
| Reaction conditions [Mass std.] | Raw material | Orthocresol | 216 | 216 | 216 | 216 | 216 | 216 | 216 | 216 | 216 | 216 | 216 |
| | | 92% Paraform | — | — | — | — | — | — | 49 | 49 | 49 | 49 | 49 |
| | | 37% Formalin | 130 | 130 | 130 | 130 | 130 | 130 | — | — | — | — | — |
| | | Compounding ratio (F/P)(mole ratio) | 0.8 | 0.8 | 0.8 | 0.8 | 0.8 | 0.8 | 0.75 | 0.75 | 0.75 | 0.75 | 0.75 |
| | Catalyst | 89% Phosphoric acid solution | 130 | 130 | 130 | 130 | 130 | 130 | 130 | 130 | 130 | 130 | 130 |
| | | Compounding amount of phosphoric acid (Pure content)(%/P) | 53.6 | 53.6 | 53.6 | 53.6 | 53.6 | 53.6 | 53.6 | 53.6 | 53.6 | 53.6 | 53.6 |
| | Cosolvent | Diethylene glycol | 108 | — | — | — | — | — | 108 | — | — | — | — |
| | | Ethylene glycol | — | 108 | — | — | — | — | — | 108 | — | — | — |
| | | Ethylene glycol Monomethyl ether | — | — | 108 | — | — | — | — | — | 108 | — | — |
| | | 1,4-Butanediol | — | — | — | 108 | — | — | — | — | — | 108 | — |
| | | 1,4-Dioxane | — | — | — | — | 108 | — | — | — | — | — | 108 |

TABLE 2-continued

|  |  | Example | | | | | | | | | | |
|---|---|---|---|---|---|---|---|---|---|---|---|---|
|  |  | 8 | 9 | 10 | 11 | 12 | 13 | 14 | 15 | 16 | 17 | 18 |
|  | Dimethyl sulfoxide | — | — | — | — | — | 108 | — | — | — | — | — |
|  | Usage (%/P) | 50 | 50 | 50 | 50 | 50 | 50 | 50 | 50 | 50 | 50 | 50 |
|  | Reaction time (hour) | 20 | 20 | 20 | 20 | 20 | 20 | 11 | 15 | 5 | 5 | 10 |
| Resin | Monomeric phenol (%) | N.D. | N.D. | N.D. | N.D. | N.D. | N.D. | N.D. | N.D. | N.D. | N.D. | N.D. |
| properties | Dimeric phenol (%) | 4.4 | 5.3 | 4.8 | 5.2 | 6 | 7.9 | 7 | 7.5 | 7.2 | 6.5 | 13.7 |
|  | Number-average molecular weight (Mn) | 807 | 829 | 799 | 774 | 778 | 797 | 695 | 621 | 551 | 539 | 475 |
|  | Weight-average molecular weight (Mw) | 1014 | 996 | 1009 | 964 | 957 | 1049 | 814 | 735 | 657 | 641 | 581 |
|  | Degree of dispersion (Mw/Mn) | 1.26 | 1.2 | 1.26 | 1.25 | 1.23 | 1.32 | 1.17 | 1.18 | 1.19 | 1.19 | 1.22 |
|  | Melt viscosity (Pa · s/150° C.) | 0.44 | 0.26 | 0.48 | 0.44 | 0.34 | 0.37 | 0.16 | 0.12 | 0.13 | 0.15 | 0.12 |
|  | Softening point (° C.) | 96 | 93 | 96 | 94 | 90 | 91 | 82 | 73 | 81 | 80 | 74 |
|  | Yield (%) | 108 | 108 | 108 | 108 | 109 | 108 | 108 | 107 | 105 | 105 | 108 |

Examples 19 to 31

Figure 3:
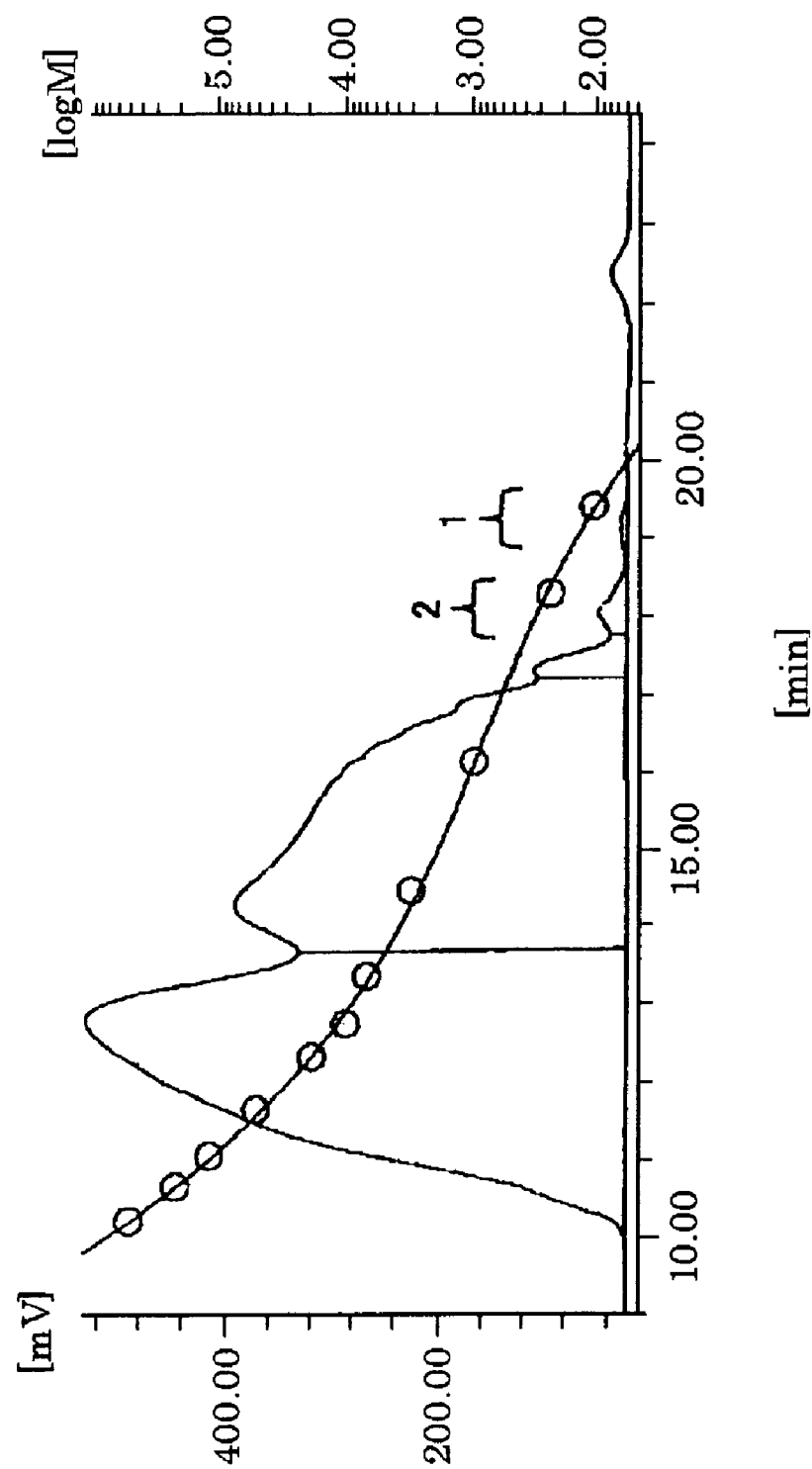
FIG. 3 is a GPC chart of the novolak resin obtained in Example 20.
Figure 4:
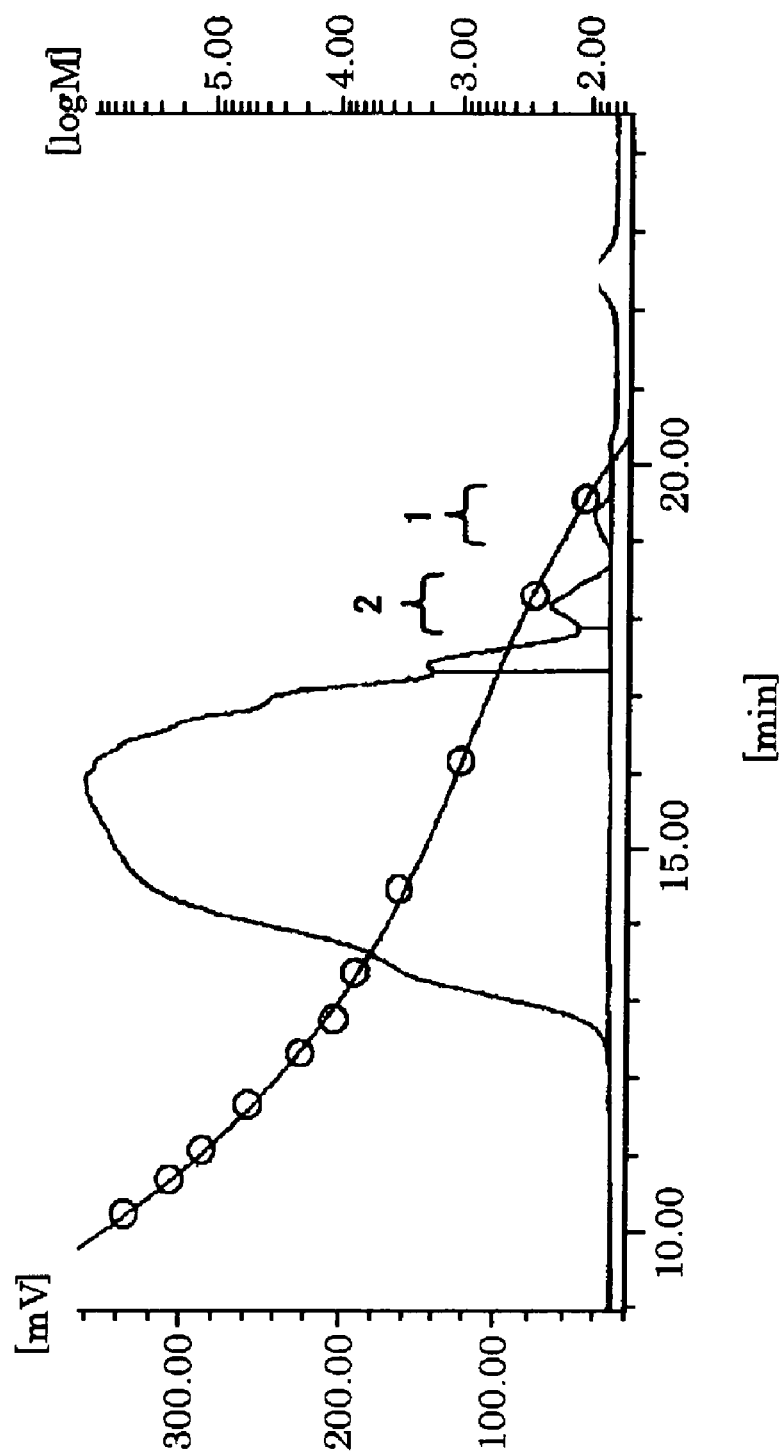
FIG. 4 is a GPC chart of the novolak resin obtained in Example 21.
Figure 5:
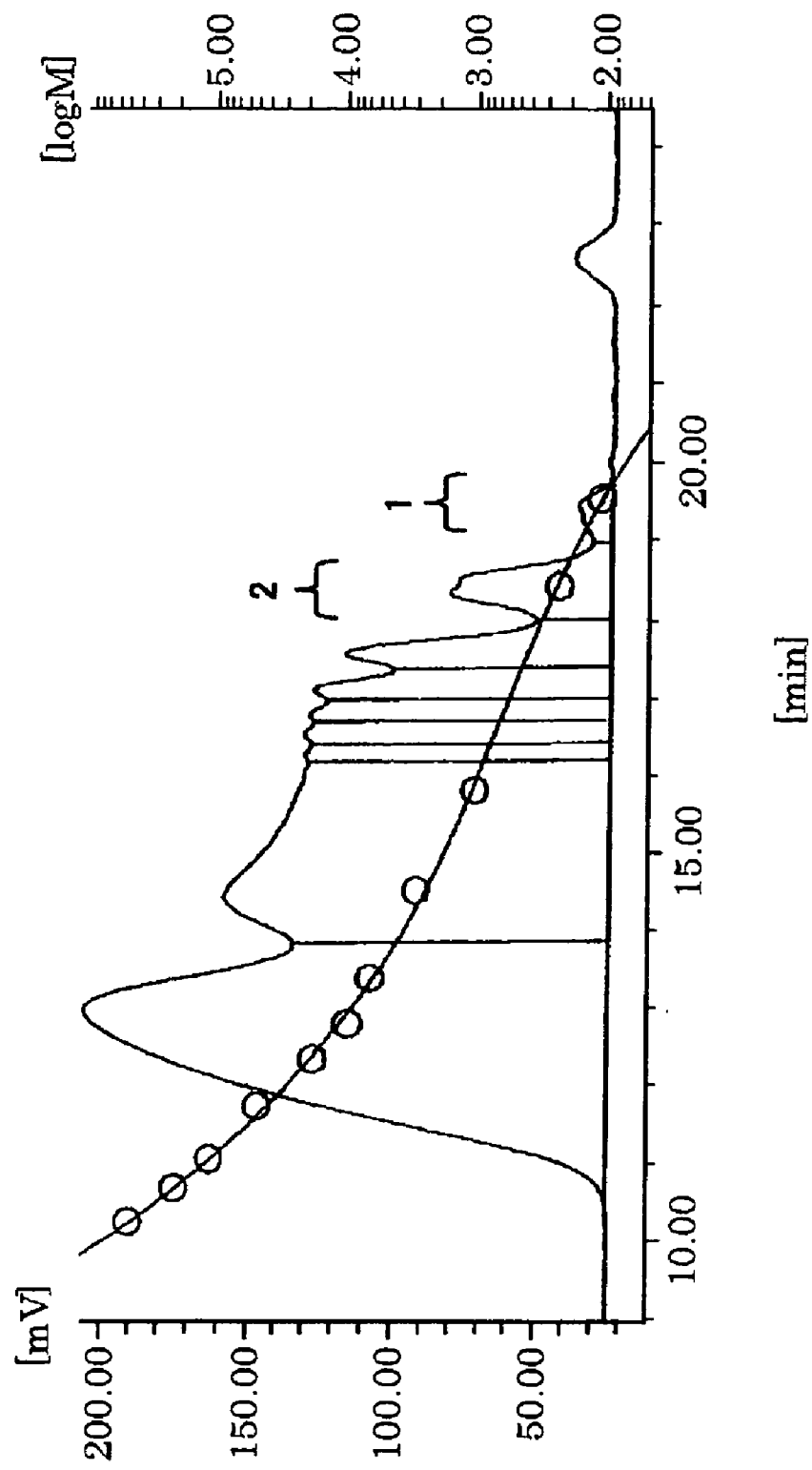
FIG. 5 is a GPC chart of the novolak resin obtained in Example 26.

Novolak resins were obtained in the same manner as in Example 1 except that the reaction conditions were changed as shown in Table 3. The measured results are shown in Table 3. GPC charts of the novolak resins obtained in Examples 20, 21 and 26 are shown in FIGS. 3, 4 and 5.

TABLE 3

|  |  |  | Example | | | | | |
|---|---|---|---|---|---|---|---|---|
|  |  |  | 19 | 20 | 21 | 22 | 23 | 24 |
| Reaction conditions [Mass std.] | Raw material | Metacresol | 100 | 100 | 100 | 100 | 100 | 100 |
|  |  | Paracresol | — | — | — | — | — | — |
|  |  | 92% Paraform | — | — | — | — | — | — |
|  |  | 37% Formalin | 71.3 | 72.8 | 67.6 | 71.3 | 68.3 | 71.3 |
|  |  | Compounding ratio (F/P)(mole ratio) | 0.95 | 0.97 | 0.9 | 0.95 | 0.91 | 0.95 |
|  | Catalyst | 89% Phosphoric acid solution | 60 | 60 | 60 | 60 | 60 | 30 |
|  |  | Compounding amount of phosphoric acid (Pure content)(%/P) | 53.4 | 53.4 | 53.4 | 53.4 | 53.4 | 26.7 |
|  | Cosolvent | Ethylene glycol Monobutyl ether | 100 | 50 | — | — | — | 100 |
|  |  | Ethylene glycol | — | 50 | 100 | — | — | — |
|  |  | Ethylene glycol Monomethyl ether | — | — | — | 75 | — | — |
|  |  | 1,4-Dioxane | — | — | — | — | 100 | — |
|  |  | Usage (%/P) | 100 | 100 | 100 | 75 | 100 | 100 |
|  | Reaction time (hour) |  | 8 | 8 | 8 | 8 | 8 | 8 |
| Resin properties | Monomeric phenol (%) |  | 0.9 | 0.2 | 0.4 | 0.2 | 0.4 | 0.5 |
|  | Dimeric phenol (%) |  | 2.4 | 0.7 | 1.7 | 0.7 | 1.2 | 3.1 |
|  | Number-average molecular weight (Mn) |  | 1572 | 2037 | 990 | 1612 | 1146 | 1338 |
|  | Weight-average molecular weight (Mw) |  | 10972 | 16893 | 1841 | 5178 | 2097 | 6286 |
|  | Degree of dispersion (Mw/Mn) |  | 6.96 | 8.29 | 1.86 | 3.21 | 1.83 | 4.7 |
|  | Softening point (° C.) |  | >200 | >200 | 152 | 184 | 153 | 169 |
|  | Yield (%) |  | 108 | 110 | 106 | 106 | 109 | 108 |
|  | Alkali dissolving velocity (Å/sec) |  | 297 | 265 | 6175 | 1097 | 5406 | 970 |

|  |  |  | Example | | | | | | |
|---|---|---|---|---|---|---|---|---|---|
|  |  |  | 25 | 26 | 27 | 28 | 29 | 30 | 31 |
| Reaction conditions [Mass std.] | Raw material | Metacresol | 100 | 90 | 80 | 80 | 80 | 60 | 40 |
|  |  | Paracresol | — | 10 | 20 | 20 | 20 | 40 | 60 |
|  |  | 92% Paraform | — | — | — | — | 27.2 | 27.2 | 27.2 |
|  |  | 37% Formalin | 71.3 | 69.3 | 67.6 | 60.1 | — | — | — |
|  |  | Compounding ratio (F/P)(mole ratio) | 0.95 | 0.93 | 0.9 | 0.8 | 0.9 | 0.9 | 0.9 |
|  | Catalyst | 89% Phosphoric acid solution | 5.6 | 60 | 60 | 60 | 11.5 | 60 | 60 |

TABLE 3-continued

| | | | | | | | | | |
|---|---|---|---|---|---|---|---|---|---|
| | | Compounding amount of acid (Pure content)(%/P) | 5 | 53.4 | 53.4 | 53.4 | 10.2 | 53.4 | 53.4 |
| | Cosolvent | Ethylene glycol Monobutyl ether | 50 | 50 | — | 100 | — | 50 | — |
| | | Ethylene glycol | — | — | 100 | — | — | 50 | — |
| | | Ethylene glycol Monomethyl ether | — | — | — | — | — | — | — |
| | | 1,4-Dioxane | — | — | — | — | 100 | — | 100 |
| | | Usage (%/P) | 50 | 50 | 100 | 100 | 100 | 100 | 100 |
| | Reaction time (hour) | | 20 | 15 | 18 | 18 | 6 | 8 | 7 |
| Resin properties | Monomeric phenol (%) | | 0.7 | 0.7 | 0.7 | 0.5 | 0.5 | 0.2 | N.D. |
| | Dimeric phenol (%) | | 4.9 | 4.2 | 3.3 | 8.5 | 4.9 | 7.5 | 5.6 |
| | Number-average molecular weight (Mn) | | 1189 | 1378 | 1220 | 684 | 1154 | 887 | 833 |
| | Weight-average molecular weight (Mw) | | 6944 | 10762 | 3966 | 1490 | 8044 | 3522 | 2145 |
| | Degree of dispersion (Mw/Mn) | | 5.84 | 7.81 | 3.25 | 2.18 | 6.97 | 3.97 | 2.57 |
| | Softening point (° C.) | | 164 | 176 | 151 | 132 | 167 | 148 | 140 |
| | Yield (%) | | 107 | 106 | 106 | 107 | 108 | 105 | 110 |
| | Alkali dissolving velocity (Å/sec) | | 843 | 574 | 1083 | 4037 | 382 | 511 | <10 |

Examples 32 to 36

Figure 6:
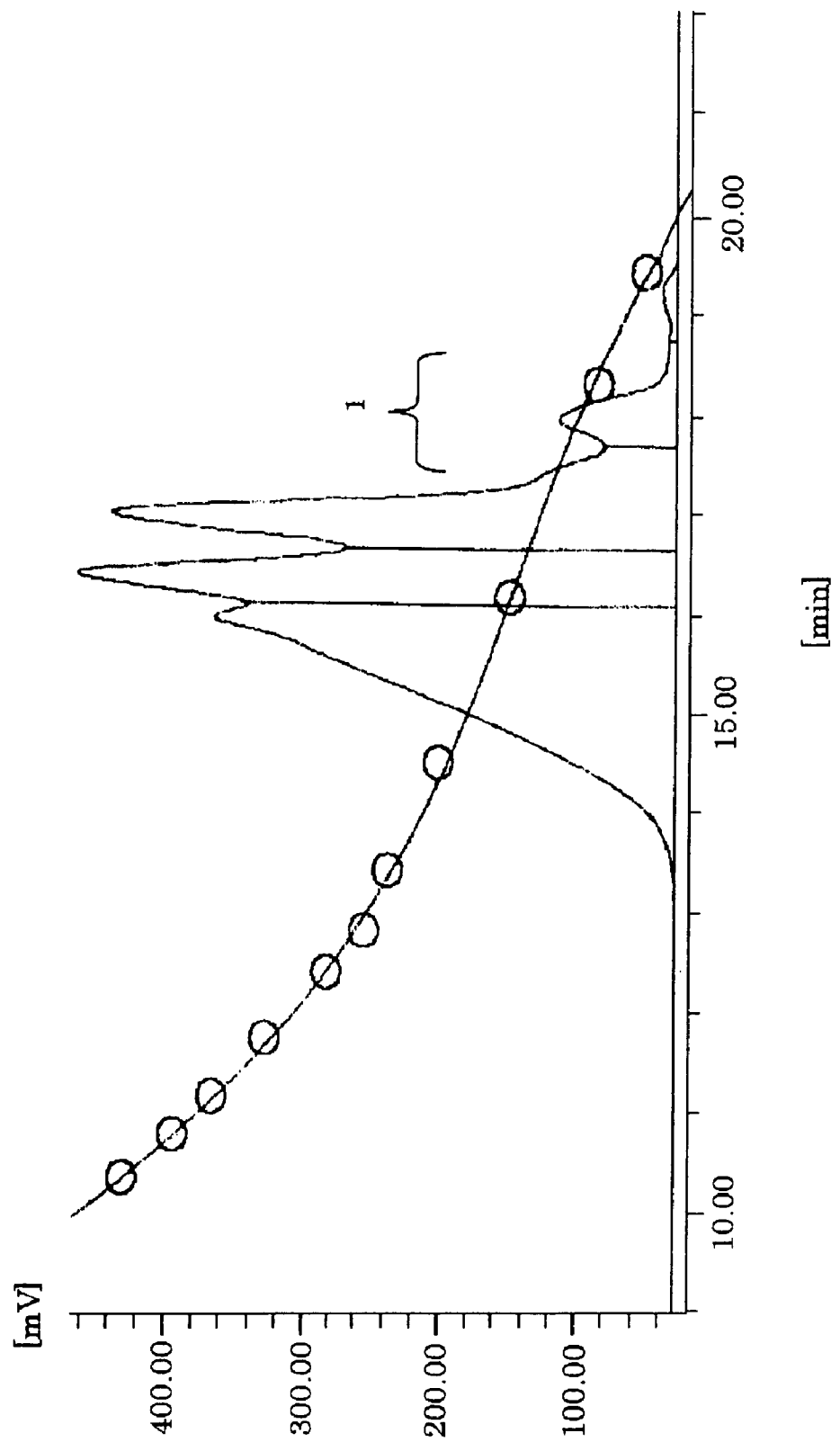
FIG. 6 is a GPC chart of the novolak resin obtained in Example 36.

Novolak resins were obtained in the same manner as in Example 1 except that the reaction conditions were changed as shown in Table 4. The measured results are shown in Table 4. A GPC chart of the novolak resin obtained in Example 36 is shown in FIG. 6.

Example 37

Into a pressure-resistant reaction vessel provided with a thermometer and a stirring device, 114 parts of bisphenol A, 13.1 parts of 92% paraformaldehyde, 68.4 parts of 89% phosphoric acid, and 57 parts of methanol were charged and raised to 110° C. in a cloudy state (two-phase mixture) formed by stirring for mixing, and at the same temperature, a condensation reaction was conducted for one hour. At that time, the internal pressure (gage pressure) was 0.30 MPa.

Then, methyl isobutyl ketone was added to dissolve the condensate while stirring for mixing, the stirring for mixing was stopped, the content was moved into a separating flask and left standing to separate into a methyl isobutyl ketone solution layer (upper layer) and an aqueous phosphoric acid solution layer (lower layer). Then, the aqueous phosphoric acid solution layer was removed, the methyl isobutyl ketone solution was washed with water several times to remove phosphoric acid, the content was returned into the reaction vessel, and the methyl isobutyl ketone was completely removed by vacuum distillation to obtain 116 parts of the novolak resin. The measured results are shown in Table 4.

Example 38

Novolak resin was obtained in the same manner as in Example 37 except that the reaction conditions were changed as shown in Table 4. The measured results are shown in Table 4.

TABLE 4

| | | | Example | | | | | | |
|---|---|---|---|---|---|---|---|---|---|
| | | | 32 | 33 | 34 | 35 | 36 | 37 | 38 |
| Reaction conditions [Mass std.] | Raw material | Bisphenol A | 228 | 228 | 228 | 228 | 228 | 114 | 114 |
| | | 92% Paraform | — | — | — | — | 26.1 | 13.1 | 13.1 |
| | | 37% Formalin | 64.9 | 64.9 | 64.9 | 64.9 | — | — | — |
| | | Compounding ratio (F/P)(mole ratio) | 0.8 | 0.8 | 0.8 | 0.8 | 0.8 | 0.8 | 0.8 |
| | Catalyst | 89% Phosphoric acid solution | 136.8 | 136.8 | 136.8 | 136.8 | 136.8 | 68.4 | 68.4 |
| | | Compounding amount of phosphoric acid (Pure content)(%/P) | 53.4 | 53.4 | 53.4 | 53.4 | 53.4 | 53.4 | 53.4 |
| | Cosolvent | Ethylene glycol Monomethyl ether | 114 | — | — | — | — | — | — |
| | | Ethylene glycol | — | 114 | — | — | — | — | — |
| | | Diethylene glycol | — | — | 114 | — | — | — | — |
| | | 1,4-Dioxane | — | — | — | 114 | 114 | — | — |
| | | Methanol | — | — | — | — | — | 57 | — |
| | | Acetone | — | — | — | — | — | — | 57 |
| | | Usage (%/P) | 50 | 50 | 50 | 50 | 50 | 50 | 50 |
| | Reaction time (hour) | | 1 | 1 | 1 | 1 | 1 | 1 | 1 |
| | Internal pressure of reaction system (gage pressure)(MPa) | | — | — | — | — | — | 0.3 | 0.2 |
| Resin properties | Monomeric phenol (%) | | 5.9 | 8.4 | 5.8 | 4.1 | 5.4 | 9.3 | 8.8 |
| | Dimeric phenol (%) | | 16.8 | 24.1 | 19.1 | 24.1 | 25.5 | 22.1 | 25.5 |
| | Number-average molecular weight (Mn) | | 832 | 688 | 767 | 805 | 672 | 722 | 753 |

TABLE 4-continued

|  | Example | | | | | | |
|---|---|---|---|---|---|---|---|
|  | 32 | 33 | 34 | 35 | 36 | 37 | 38 |
| Weight-average molecular weight (Mw) | 1500 | 1090 | 1460 | 1250 | 940 | 1105 | 1227 |
| Degree of dispersion (Mw/Mn) | 1.81 | 1.59 | 1.91 | 1.55 | 1.4 | 1.53 | 1.63 |
| Melt viscosity (Pa · s/180° C.) | 3.33 | 0.6 | 1.91 | 1.92 | 1.07 | 1.49 | 0.59 |
| Softening point (° C.) | 133 | 122 | 130 | 129 | 124 | 129 | 121 |
| Yield (%) | 104 | 104 | 104 | 105 | 105 | 103 | 105 |

Examples 39 to 43

Figure 7:
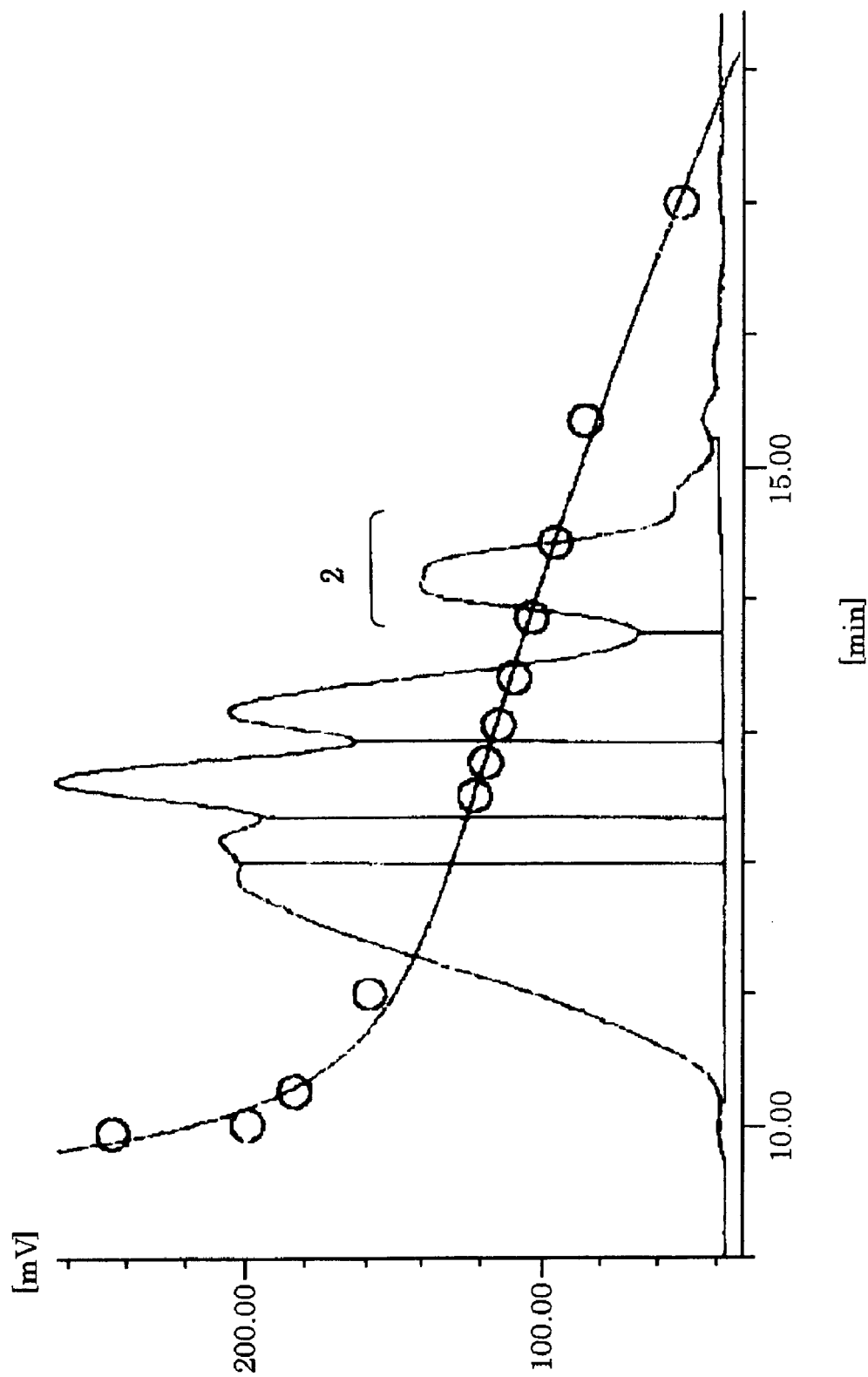
FIG. 7 is a GPC chart of the novolak resin at the completion of condensation obtained in Example 41.

Novolak resins were obtained in the same manner as in Example 37 except that the reaction conditions were changed as shown in Table 5 and the reaction temperature was changed to 150° C. The measured results are shown in Table 4. A GPC chart of the novolak resin at the completion of condensation obtained in Example 41 is shown in FIG. 7.

Examples 44 to 50

Novolak resins were obtained in the same manner as in Example 1 except that the reaction conditions were changed as shown in Table 5. The measured results are shown in Table 5. In Examples 49 and 50, polyoxyalkylene alkyl ether (NAROACTY HN100 produced by Sanyo Chemical Industries, Ltd.) was used as a surface active agent.

TABLE 5

|  |  |  | Example | | | | | |
|---|---|---|---|---|---|---|---|---|
|  |  |  | 39 | 40 | 41 | 42 | 43 | 44 |
| Reaction conditions [Mass std.] | Raw material | Orthophenyl phenol | 170.2 | 170.2 | 170.2 | 119.2 | 170.2 | 85.1 |
|  |  | Ortho-tert-butylphenol | — | — | — | — | — | — |
|  |  | Orthocycrohexylphenol | — | — | — | — | — | — |
|  |  | 92% Paraform | 26.1 | 26.1 | 26.1 | — | 19.6 | 13.1 |
|  |  | 37% Formalin | — | — | — | 45.5 | — | — |
|  |  | Compounding ratio (F/P)(mole ratio) | 0.8 | 0.8 | 0.8 | 0.8 | 0.6 | 0.8 |
|  | Catalyst | 89% Phosphoric acid solution | 102.1 | 102.1 | 102.1 | 71.5 | 102.1 | 51.1 |
|  |  | Compounding amount of phosphoric acid (Pure content)(%/P) | 53.4 | 53.4 | 53.4 | 53.4 | 53.4 | 53.4 |
|  | Cosolvent | 1,4-Dioxane | 85.1 | — | — | 59.6 | 85.1 | 42.6 |
|  |  | Polyethylene glycol | — | 85.1 | — | — | — | — |
|  |  | Ethylene glycol Monomethyl ether | — | — | 85.1 | — | — | — |
|  |  | Methanol | — | — | — | — | — | — |
|  |  | Usage (%/P) | 50 | 50 | 50 | 50 | 50 | 50 |
|  | Surface active agent |  | — | — | — | — | — | — |
|  | Compounding amount of surface active agent (%/P) |  | — | — | — | — | — | — |
|  | Reaction time (hour) |  | 10 | 10 | 10 | 20 | 10 | 24 |
|  | Internal pressure of reaction system (gage pressure)(MPa) |  | 0.15~0.20 | 0.07~0.10 | 0.10~0.14 | 0.36~0.39 | 0.16~0.20 | — |
| Resin properties | Monomeric phenol (%) |  | N.D. | N.D. | N.D. | N.D. | N.D. | N.D. |
|  | Dimeric phenol (%) |  | 17.1 | 17.5 | 14.7 | 21.4 | 49.1 | 35.6 |
|  | Number-average molecular weight (Mn) |  | 531 | 806 | 824 | 767 | 537 | 623 |
|  | Weight-average molecular weight (Mw) |  | 851 | 1151 | 1136 | 1048 | 636 | 819 |
|  | Degree of dispersion (Mw/Mn) |  | 1.23 | 1.43 | 1.38 | 1.37 | 1.18 | 1.31 |
|  | Melt viscosity (Pa · s/180° C.) |  | 0.89 | 1.13 | 1.8 | 1.24 | 0.02 | 0.2 |
|  | Softening point (° C.) |  | 101.8 | 103.9 | 106.5 | 104.1 | 69.3 | 87 |
|  | Yield (%) |  | 106 | 107 | 106 | 105 | 103 | 105 |

|  |  |  | Example | | | | | |
|---|---|---|---|---|---|---|---|---|
|  |  |  | 45 | 46 | 47 | 48 | 49 | 50 |
| Reaction conditions [Mass std.] | Raw material | Orthophenyl phenol | — | — | 50 | 50 | 50 | 50 |
|  |  | Ortho-tert-butylphenol | 75.1 | — | — | — | — | — |
|  |  | Orthocycrohexylphenol | — | 88.1 | — | — | — | — |
|  |  | 92% Paraform | 13.1 | 13.1 | 5.7 | 5.7 | 5.7 | 5.7 |
|  |  | 37% Formalin | — | — | — | — | — | — |
|  |  | Compounding ratio (F/P)(mole ratio) | 0.8 | 0.8 | 0.6 | 0.6 | 0.6 | 0.6 |
|  | Catalyst | 89% Phosphoric acid solution | 45.1 | 52.9 | 30 | 30 | 30 | 30 |

TABLE 5-continued

| | | | | | | | | |
|---|---|---|---|---|---|---|---|---|
| | | Compounding amount of phosphoric acid (Pure content)(%/P) | 53.4 | 53.4 | 53.4 | 53.4 | 53.4 | 53.4 |
| | Cosolvent | 1,4-Dioxane | 75.1 | 44.1 | 25 | — | 25 | — |
| | | Polyethylene glycol | — | — | — | — | — | — |
| | | Ethylene glycol Monomethyl ether | — | — | — | — | — | — |
| | | Methanol | — | — | — | 10 | — | 10 |
| | | Usage (%/P) | 100 | 50 | 50 | 20 | 50 | 20 |
| | Surface active agent | | — | — | — | — | 2.5 | 2.5 |
| | Compounding amount of surface active agent (%/P) | | — | — | — | — | 5 | 5 |
| | Reaction time (hour) | | 24 | 24 | 2 | 2 | 2 | 2 |
| | Internal pressure of reaction system (gage pressure)(MPa) | | — | — | — | — | — | — |
| Resin properties | Monomeric phenol (%) | | N.D. | N.D. | N.D. | N.D. | N.D. | N.D. |
| | Dimeric phenol (%) | | 19.5 | 31.5 | 78.9 | 95.4 | 86.7 | 95.7 |
| | Number-average molecular weight (Mn) | | 919 | 828 | 373 | 370 | 364 | 360 |
| | Weight-average molecular weight (Mw) | | 1295 | 1095 | 441 | 407 | 415 | 392 |
| | Degree of dispersion (Mw/Mn) | | 1.41 | 1.32 | 1.18 | 1.1 | 1.14 | 1.09 |
| | Melt viscosity (Pa · s/180° C.) | | 0.56 | 0.76 | <0.01 | <0.01 | <0.01 | <0.01 |
| | Softening point (° C.) | | 99.2 | 98.8 | 47 | 52 | 49 | 52 |
| | Yield (%) | | 106 | 106 | 81 | 73 | 97 | 84 |

Examples 51 to 56

Figure 8:
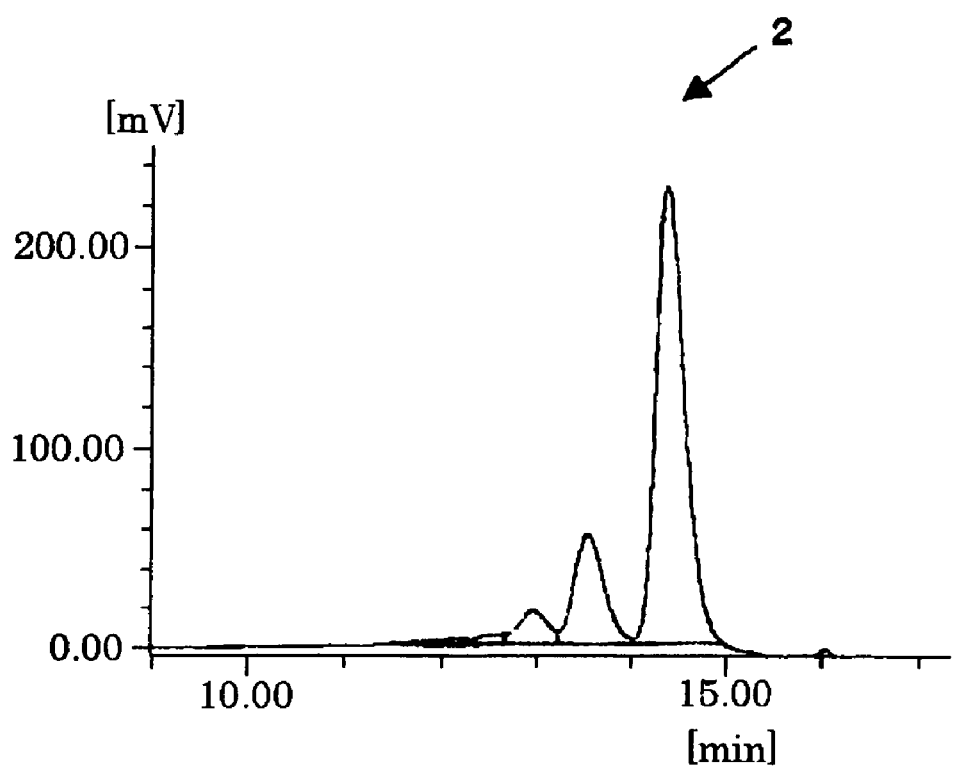
FIG. 8 is a GPC chart of the novolak resin at the completion of condensation obtained in Example 55.

Novolak resins were obtained in the same manner as in Example 1 except that the reaction conditions were changed as shown in Table 6. The measured results are shown in Table 6. A GPC chart of the novolak resin at the completion of condensation obtained in Example 55 is shown in FIG. 8. In Examples 54 to 56, polyoxyalkylene alkylether (NAROACTY HN100 produced by Sanyo Chemical Industries, Ltd.) was used as a surface active agent.

TABLE 6

| | | | Example | | | | | |
|---|---|---|---|---|---|---|---|---|
| | | | 51 | 52 | 53 | 54 | 55 | 56 |
| Reaction conditions [Mass std.] | Raw material | Para-tert-butylphenol | 50 | 50 | — | 50 | 50 | 50 |
| | | Paraphenyl phenol | — | — | 50 | — | — | — |
| | | 92% Paraform | 6.5 | 6.5 | 5.3 | 5.4 | 6 | 6.5 |
| | | 37% Formalin | — | — | — | — | — | — |
| | | Compounding ratio (F/P)(mole ratio) | 0.6 | 0.6 | 0.55 | 0.5 | 0.55 | 0.6 |
| | Catalyst | 89% Phosphoric acid solution | 30 | 30 | 30 | 30 | 30 | 30 |
| | | Compounding amount of phosphoric acid (Pure content)(%/P) | 53.4 | 53.4 | 53.4 | 53.4 | 53.4 | 53.4 |
| | Cosolvent | 1,4-Dioxane | — | — | 12.5 | 12.5 | 12.5 | 12.5 |
| | | glycerine | 12.5 | — | — | — | — | — |
| | | Methanol | — | 2.5 | — | — | — | — |
| | | Usage (%/P) | 25 | 5 | 25 | 25 | 25 | 25 |
| | Surface active agent | | — | — | — | 2.5 | 2.5 | 2.5 |
| | Compounding amount of surface active agent (%/P) | | — | — | — | 5 | 5 | 5 |
| | Reaction time (hour) | | 4 | 5 | 7 | 5 | 2 | 2 |
| Resin properties | Monomeric phenol (%) | | N.D. | N.D. | N.D. | N.D. | N.D. | N.D. |
| | Dimeric phenol (%) | | 76.9 | 70.9 | 65 | 77.6 | 73.6 | 68.1 |
| | Number-average molecular weight (Mn) | | 490 | 509 | 383 | 491 | 500 | 509 |
| | Weight-average molecular weight (Mw) | | 535 | 570 | 460 | 525 | 550 | 580 |
| | Degree of dispersion (Mw/Mn) | | 1.09 | 1.12 | 1.2 | 1.07 | 1.1 | 1.14 |
| | Melt viscosity (Pa · s/180° C.) | | <0.01 | <0.01 | <0.01 | <0.01 | <0.01 | <0.01 |
| | Softening point (° C.) | | 69 | 73 | 40 | 68 | 71 | 75 |
| | Yield (%) | | 93 | 93 | 90 | 92 | 103 | 98 |

Example 57

Novolak resin was obtained in the same manner as in Example 1 except that the reaction conditions were changed as shown in Table 7. The measured results are shown in Table 7.

Examples 58 to 65

Figure 9:
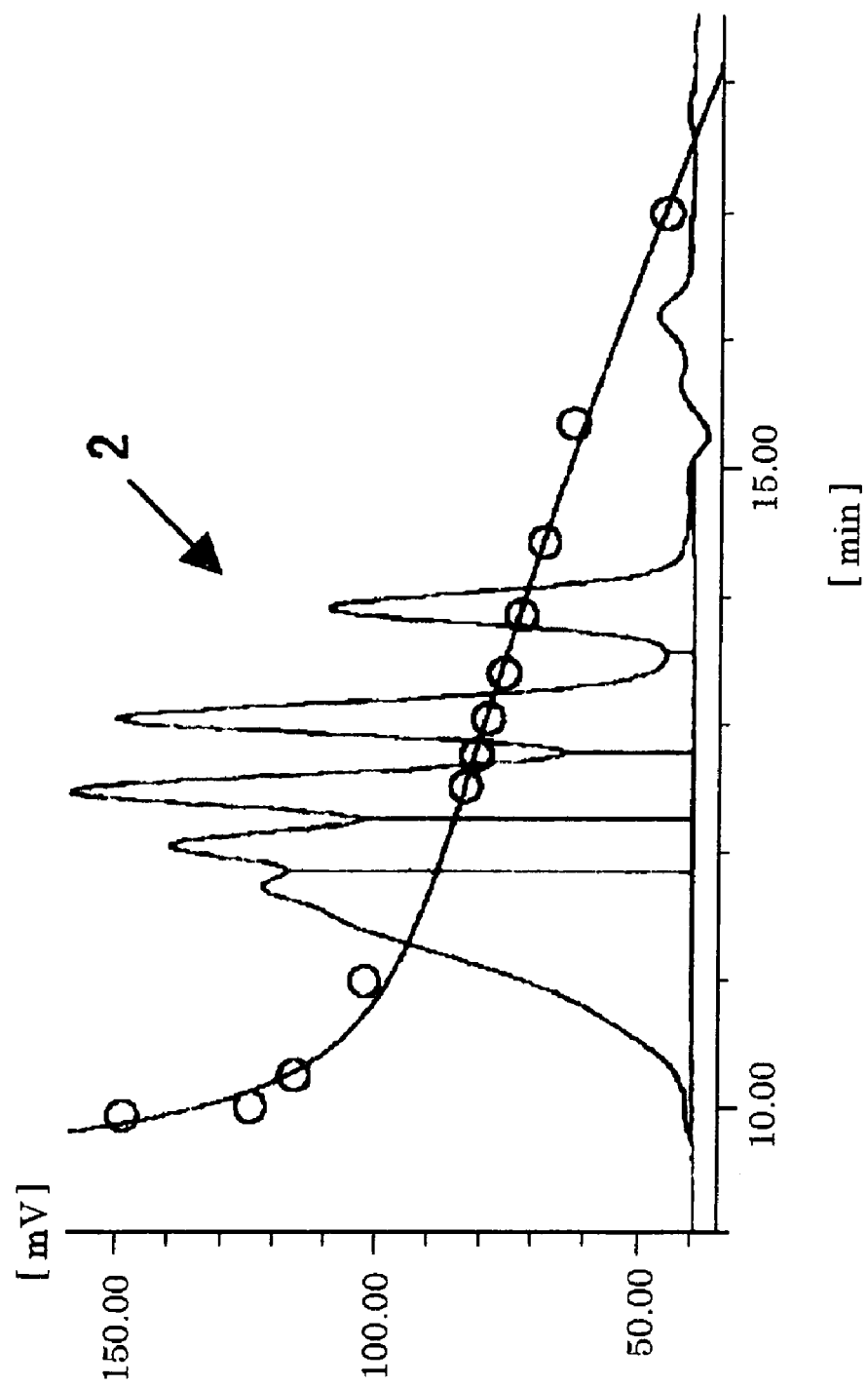
FIG. 9 is a GPC chart of the novolak resin at the completion of condensation obtained in Example 61.

Novolak resins were obtained in the same manner as in Example 37 except that the reaction conditions were changed as shown in Table 7 and the reaction temperature was changed to 130° C. The measured results are shown in Table 7. A GPC chart of the novolak resin at the completion of condensation obtained in Example 61 is shown in FIG. 9.

TABLE 7

|  |  |  | Example |  |  |  |  |
|---|---|---|---|---|---|---|---|
|  |  |  | 57 | 58 | 59 | 60 | 61 |
| Reaction conditions [Mass std.] | Raw material | Para-tert-butylphenol | 75.1 | 100 | 100 | 100 | 100 |
|  |  | Paraphenyl phenol | — | — | — | — | — |
|  |  | 92% Paraform | 13.1 | 17.4 | 17.4 | 17.4 | 17.4 |
|  |  | 37% Formalin | — | — | — | — | — |
|  |  | Compounding ratio (F/P)(mole ratio) | 0.8 | 0.8 | 0.8 | 0.8 | 0.8 |
|  | Catalyst | 89% Phosphoric acid solution | 45.1 | 60 | 60 | 60 | 60 |
|  |  | Compounding amount of phosphoric acid (Pure content)(%/P) | 53.4 | 53.4 | 53.4 | 53.4 | 53.4 |
|  | Cosolvent | 1,4-Dioxane | 37.6 | 50 | — | — | — |
|  |  | Methanol | — | — | 50 | — | — |
|  |  | n-Propanol | — | — | — | 50 | — |
|  |  | n-Butanol | — | — | — | — | 50 |
|  |  | Ethylene glycol Monomethyl ether | — | — | — | — | — |
|  |  | Ethylene glycol | — | — | — | — | — |
|  |  | Usage (%/P) | 50 | 50 | 50 | 50 | 50 |
|  | Internal pressure of reaction system (gage pressure)(MPa) |  | — | 0.12 | 0.42~0.70 | 0.11~0.20 | 0.10~0.13 |
|  | Reaction time (hour) |  | 24 | 10 | 10 | 10 | 10 |
| Resin properties | Monomeric phenol (%) |  | N.D. | N.D. | N.D. | N.D. | N.D. |
|  | Dimeric phenol (%) |  | 19.5 | 19.8 | 9.4 | 10.0 | 11.7 |
|  | Number-average molecular weight (Mn) |  | 774 | 774 | 971 | 711 | 840 |
|  | Weight-average molecular weight (Mw) |  | 987 | 973 | 1343 | 861 | 1062 |
|  | Degree of dispersion (Mw/Mn) |  | 1.27 | 1.26 | 1.38 | 1.21 | 1.26 |
|  | Melt viscosity (Pa·s/180° C.) |  | 0.08 | 0.06 | 0.6 | 0.33 | 0.26 |
|  | Softening point (° C.) |  | 114 | 113 | 135 | 129 | 126 |
|  | Yield (%) |  | 105 | 105 | 105 | 106 | 107 |

|  |  |  | Example |  |  |  |
|---|---|---|---|---|---|---|
|  |  |  | 62 | 63 | 64 | 65 |
| Reaction conditions [Mass std.] | Raw material | Para-tert-butylphenol | 100 | 100 | 100 | — |
|  |  | Paraphenyl phenol | — | — | — | 100 |
|  |  | 92% Paraform | 17.4 | 17.4 | 19.6 | 15.3 |
|  |  | 37% Formalin | — | — | — | — |
|  |  | Compounding ratio (F/P)(mole ratio) | 0.8 | 0.8 | 0.9 | 0.8 |
|  | Catalyst | 89% Phosphoric acid solution | 60 | 60 | 60 | 60 |
|  |  | Compounding amount of phosphoric acid (Pure content)(%/P) | 53.4 | 53.4 | 53.4 | 53.4 |
|  | Cosolvent | 1,4-Dioxane | — | — | — | 50 |
|  |  | Methanol | — | — | — | — |
|  |  | n-Propanol | — | — | 50 | — |
|  |  | n-Butanol | — | — | — | — |
|  |  | Ethylene glycol Monomethyl ether | 50 | — | — | — |
|  |  | Ethylene glycol | — | 50 | 50 | — |
|  |  | Usage (%/P) | 50 | 50 | 50 | 50 |
|  | Internal pressure of reaction system (gage pressure)(MPa) |  | 0.03 | 0.12 | 0.20~0.23 | 0.15~0.20 |
|  | Reaction time (hour) |  | 10 | 10 | 10 | 10 |
| Resin properties | Monomeric phenol (%) |  | N.D. | N.D. | N.D. | N.D. |
|  | Dimeric phenol (%) |  | 15.2 | 16.3 | 2.2 | 13.4 |

TABLE 7-continued

|  | | | | |
|---|---|---|---|---|
| Number-average molecular weight (Mn) | 857 | 871 | 1114 | 845 |
| Weight-average molecular weight (Mw) | 1235 | 1148 | 1484 | 1367 |
| Degree of dispersion (Mw/Mn) | 1.44 | 1.32 | 1.33 | 1.62 |
| Melt viscosity (Pa · s/180° C.) | 0.18 | 0.21 | >1.0 | 0.52 |
| Softening point (° C.) | 122 | 123 | 156 | 132 |
| Yield (%) | 105 | 105 | 104 | 106 |

Comparative Example 1

Figure 10:
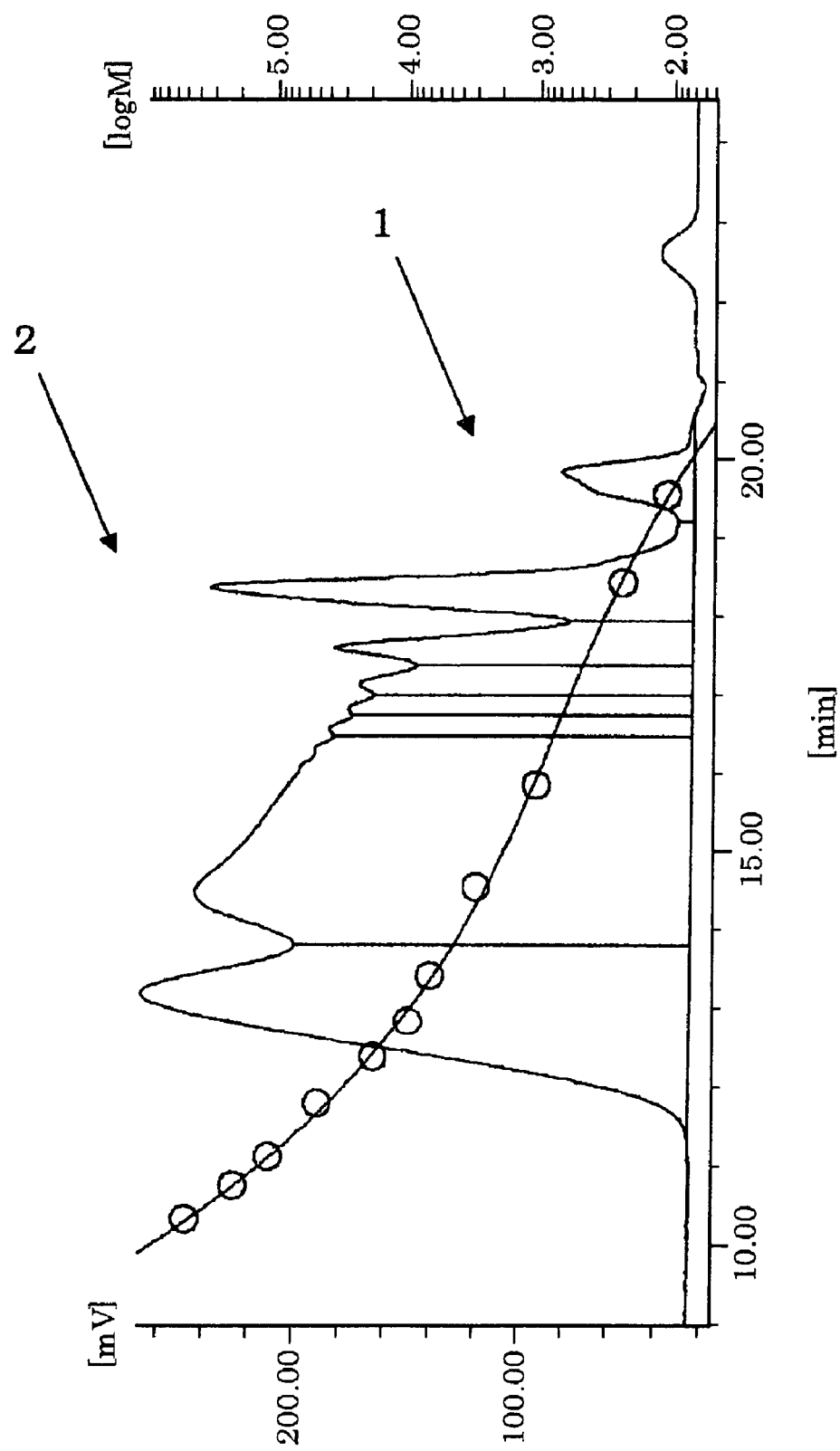
FIG. 10 is a GPC chart of the novolak resin obtained in Comparative Example 1.

Into a reaction vessel provided with a thermometer, a stirring device and a condenser, 193 parts of phenol, 142 parts of 37% formalin and 0.97 parts of oxalic acid were charged and gradually raised to a reflux temperature (98 to 102° C.) and, at the same temperature, a condensation reaction was conducted for six hours, and concentration was conducted under a reduced pressure to obtain 199 g of a novolak resin. The measured results are shown in Table 8. A GPC chart of the obtained novolak resin is shown in FIG. 10.

Comparative Examples 2 to 9

Figure 11:
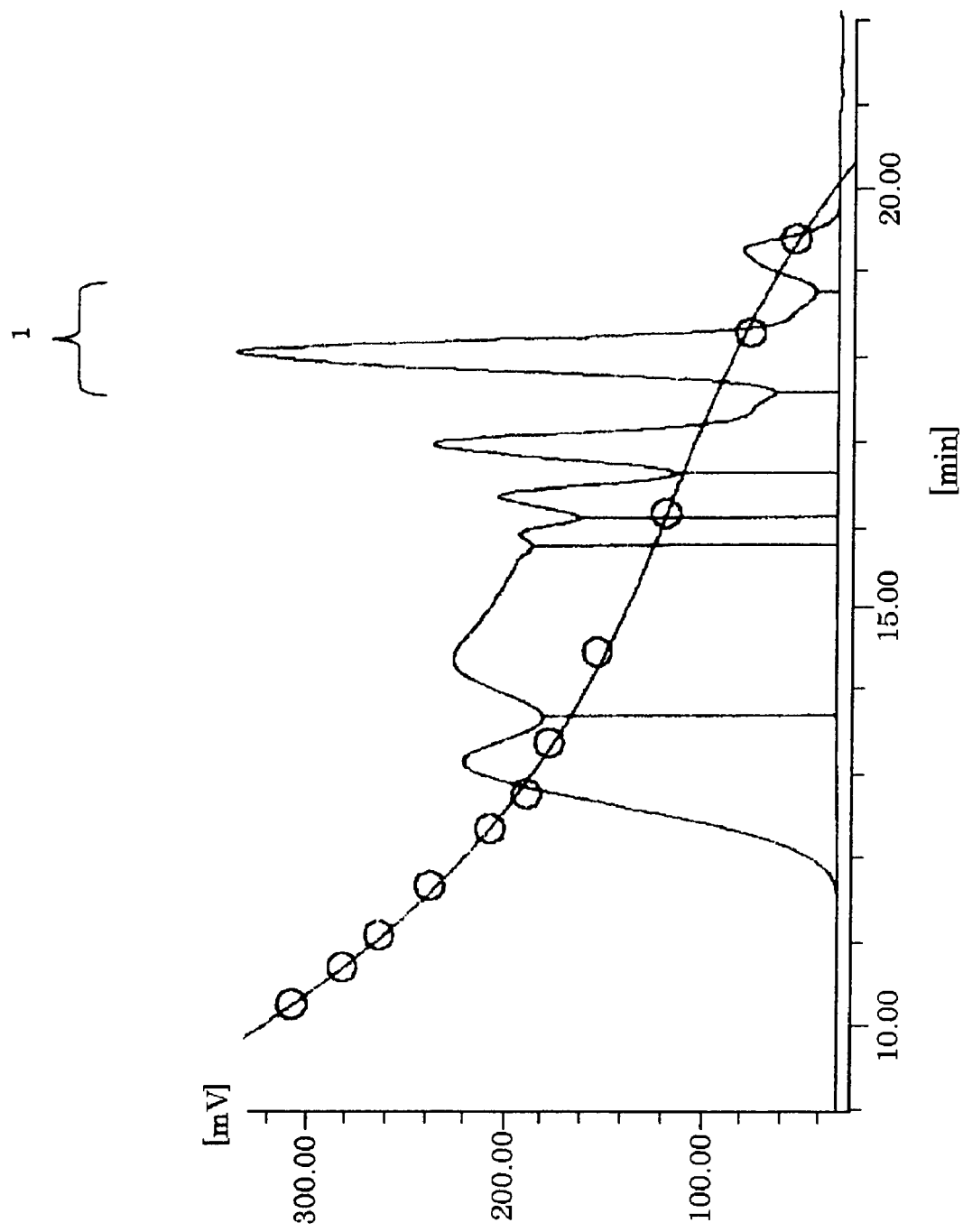
FIG. 11 is a GPC chart of the novolak resin obtained in Comparative Example 6.
Figure 12:
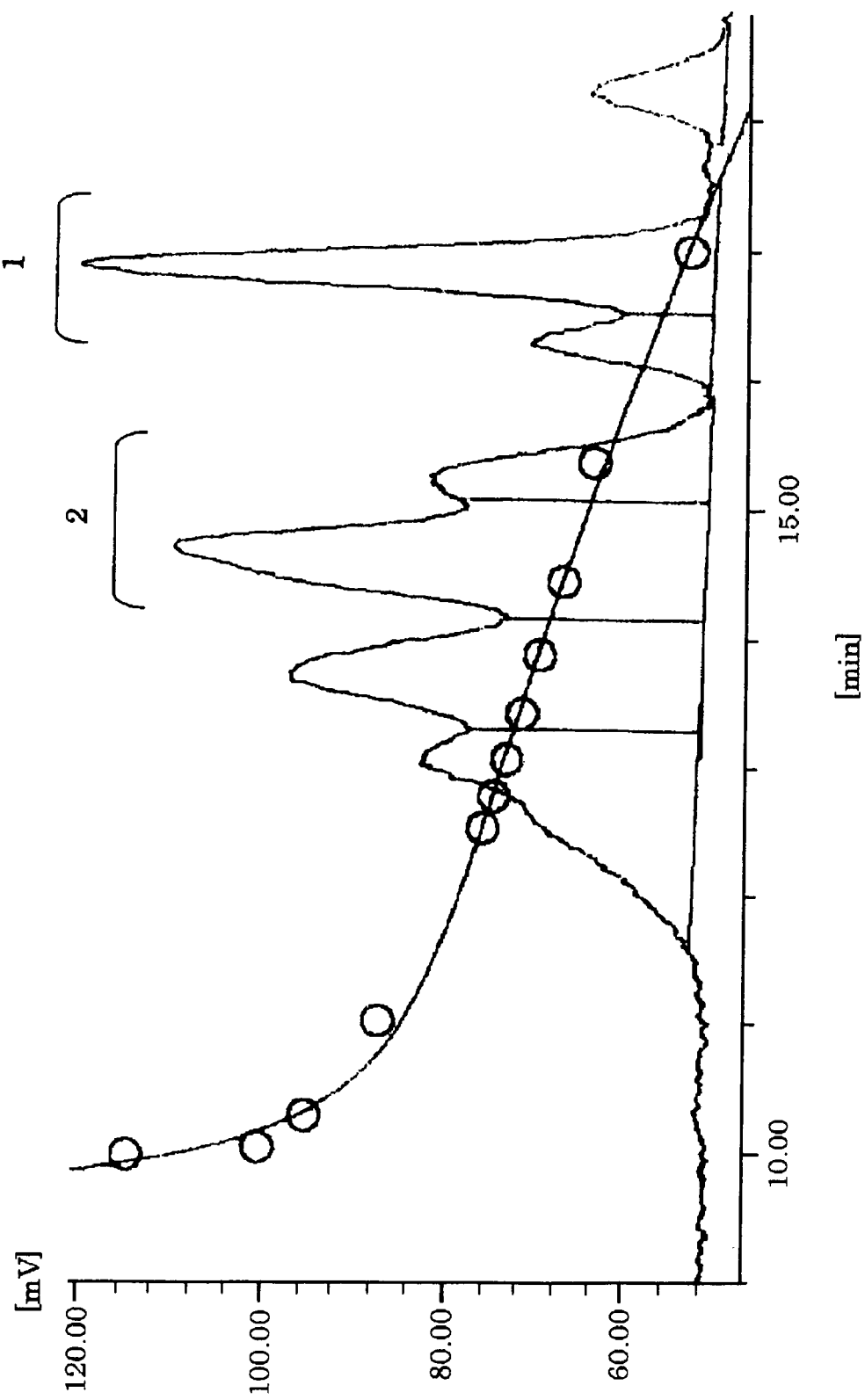
FIG. 12 is a GPC chart of the novolak resin obtained in Comparative Example 8 at the completion of condensation.
Figure 13:
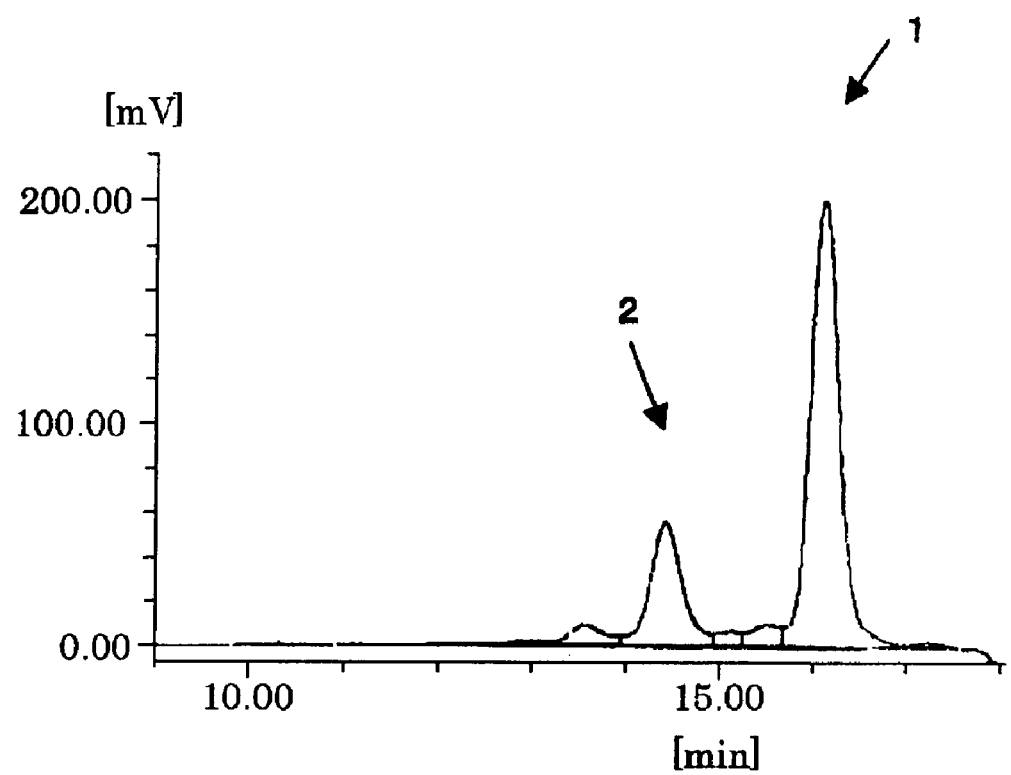
FIG. 13 is a GPC chart of the novolak resin at the completion of condensation obtained in Comparative Example 9.

Novolak resins were obtained in the same manner as in Comparative Example 1 except that the reaction conditions were changed as shown in Table 8. The measured results are shown in Table 8. A GPC chart of the novolak resin obtained in Comparative Example 6 is shown in FIG. 11, and GPC charts of the novolak resins at the completion of condensation obtained in Comparative Examples 8, 9 are shown in FIGS. 12, 13.

Example 66

In a reaction vessel provided with a thermometer, a stirring device and a condenser, novolak resin was obtained (a monomeric phenol: N.D., a dimeric phenol: 10.0%, a number-average molecular weight (Mn): 681, a weight-average molecular weight (Mw): 826, a degree of dispersion (Mw/Mn): 1.21) in the same manner as in Example 14 except that the compounding ratio (F/P) in Example 14 was changed from 0.75 to 0.80.

The novolak resin 50 parts (hydroxyl equivalent: 117 g/eq, equivalent weight 0.43), epichlorohydrin 296 parts (equivalent weight 3.2) and n-butanol 100 parts were charged and stirred for mixing so as to prepare a homogeneous solution. Then, 39 parts of 48% sodium hydroxide solution (equivalent weight 0.47) was dripped for 30 minutes. After the dripping was completed, the reaction was further conducted at 70° C. for 30 minutes. After cooling to 40° C. or below, the solution was left standing still to separate into a water layer (upper layer) and an n-butanol solution layer (lower layer).

TABLE 8

| | | | Comparative Example | | | | | | | | |
|---|---|---|---|---|---|---|---|---|---|---|---|
| | | | 1 | 2 | 3 | 4 | 5 | 6 | 7 | 8 | 9 |
| Reaction conditions [Mass std.] | Raw material | Phenol | 193 | 193 | 193 | — | — | — | — | — | — |
| | | Orthocresol | — | — | — | 216 | — | — | — | — | — |
| | | Metacresol | — | — | — | — | 80 | — | — | — | — |
| | | Paracresol | — | — | — | — | 20 | — | — | — | — |
| | | Bisphenol A | — | — | — | — | — | 228 | 228 | — | — |
| | | Orthophenylphenol | — | — | — | — | — | — | — | 85.1 | — |
| | | Para-tert-butylphenol | — | — | — | — | — | — | — | — | 50 |
| | | 92% Paraform | — | — | — | — | — | — | — | 13.1 | — |
| | | 47% Formalin | — | — | — | 102 | — | 51.1 | 41.5 | — | — |
| | | 37% Formalin | 142 | 130 | 83 | — | 60.1 | — | — | — | 14.9 |
| | | Compounding ratio (F/P)(mole ratio) | 0.85 | 0.78 | 0.5 | 0.8 | 0.8 | 0.8 | 0.65 | 0.8 | 0.55 |
| | Catalyst | Oxalic acid | 0.97 | 0.97 | 0.97 | 1.08 | 0.2 | 2.28 | 2.28 | 0.85 | 0.5 |
| | Cosolvent | Ethylene glycol | — | — | — | — | — | — | — | — | 5 |
| | | Usage (%/P) | — | — | — | — | — | — | — | — | 10 |
| | Reaction time (hour) | | 6 | 6 | 8 | 10.5 | 6 | 2.5 | 3 | 20 | 1 |
| Resin properties | Monomeric phenol (%) | | 2.6 | 1.2 | 0.5 | 1.3 | 0.55 | 14.2 | 20.4 | N.D. | — |
| | Dimeric phenol (%) | | 9.4 | 11.2 | 26.4 | 17.6 | 9.95 | 10.1 | 14.9 | 14.4 | 71 |
| | Number-average molecular weight (Mn) | | 888 | 673 | 432 | 589 | 763 | 745 | 566 | 645 | 511 |
| | Weight-average molecular weight (Mw) | | 4606 | 2165 | 651 | 878 | 3497 | 2900 | 1390 | 910 | 575 |
| | Degree of dispersion (Mw/Mn) | | 5.19 | 3.2 | 1.5 | 1.49 | 4.58 | 3.89 | 2.45 | 1.41 | 1.13 |
| | Melt viscosity (Pa · s/150° C.) | | 13.0 | 4.2 | 0.12 | 0.13 | — | 4.16 | 0.19 | 3.15 | <0.01 |
| | Softening point (° C.) | | 115 | 106.9 | 68.4 | 78 | 136 | 131 | 116 | 109.4 | 74 |
| | Yield (%) | | 103 | 97 | 75 | 106 | 88 | 104 | 103 | 79 | 29 |

Then, the n-butanol solution obtained by separating as described above was moved into a separating flask and washed by water until the washing water became neutral. The solution was returned to the reaction vessel, and the n-butanol and the epichlorohydrin were removed by vacuum distillation to obtain epoxy resin. The measured results are shown in Table 9.

Comparative Example 10

Epoxy resin was obtained in the same manner as in Example 66 except that the novolak resin was changed to the novolak resin synthesized in Comparative Example 4. The measured results are shown in Table 9.

TABLE 9

|  | Example 66 | Comp. Ex. 10 |
|---|---|---|
| Monomeric phenol + dimeric phenol (%) | 10.7 | 18 |
| Melt viscosity (Pa · s/150° C.) | 0.054 | 0.096 |
| Epoxy equivalent (g/eq) | 207 | 212 |
| Softening point (° C.) | 49 | 51 |

Example 67, Comparative Examples 11, 12

Example 67

Into a reaction vessel provided with a thermometer, a stirring device, a condenser and a dropping funnel, 60 parts of the novolak resin (hydroxyl equivalent 119 g/eq) obtained in Example 34, 349.7 parts of epichlorohydrin, 120 parts of n-butanol were charged, and a temperature was raised to 70° C. to completely dissolve the novolak resin. Then, after cooling to 50° C., 46.2 parts of 48% sodium hydroxide solution was dripped, and the temperature was gradually raised so that the inner temperature became 70° C. when the dripping was completed. When the dripping was completed, an epoxidation reaction was conducted at 70° C. for 0.5 hour, and the reaction was stopped. After the inner temperature was cooled to room temperature, methyl isobutyl ketone was added while stirring for mixing to dissolve the content.

Then, the content was moved into a separating flask and left standing to separate into a methyl isobutyl ketone solution layer (upper layer) and an aqueous sodium hydroxide solution layer (lower layer). Then, the aqueous sodium hydroxide solution layer was removed, the methyl isobutyl ketone solution was washed with water several times to remove sodium hydroxide, the content was returned into the reaction solution, and methyl isobutyl ketone and excess epichlorohydrin were removed completely by vacuum distillation to obtain 85 parts of the epoxy resin. The measured results are shown in Table 10.

Comparative Examples 11, 12

Epoxy resins were obtained in the same manner as in Example 67 except that the novolak resin was changed to the novolak resin (hydroxyl equivalent 119 g/eq) obtained in Comparative Example 6 and the novolak resin (hydroxyl equivalent 119 g/eq) obtained in Comparative Example 7. The measured results are shown in Table 10.

[Rheometer Measurement]

The obtained epoxy resin 20 g and phenol novolak (a product of Asahi Organic Chemicals Industry Co., Ltd., Mw; 959, Mn; 611) 10 g as a curing agent were mixed by heating to melt in an aluminum cup. Then, the mixture 10 g and 2-methyl imidazole (a curing accelerator) 0.05 g were mixed by pulverizing by a coffee mill to prepare a mixture, the prepared mixture 6 g and Crystalite A-1 (product of TATSUMORI LTD.) 14 g as an inorganic filler were mixed by pulverizing by the coffee mill for 30 seconds to prepare a sample.

Then, the sample 18 g was charged into a 50×70×2.5-mm mold heated to 180° C. and formed into a 70×50×2.5-mm compact under compression ($8.4 \times 10^6$ Pa (86 kg/cm$^2$)) by a 20-t press machine, and it was cut into a size of 12×50×2.5 mm by a LUXO® to prepare a test piece. Then, the test piece was sandwiched by a jig for tension test to measure the viscoelasticity of the compact by a torsion method using an ARES (Advance Rheometric Expansion System) viscoelasticity measuring system of Rheometric Scientific F. E. Inc. The measuring conditions were a distortion of 0.01%, a frequency of 10 Hz, a tensile load of 15 g, a measured temperature range of 25 to 300° C., a temperature rising velocity of 10° C./minute, and the number of measurements 1/30 seconds.

Figure 14:
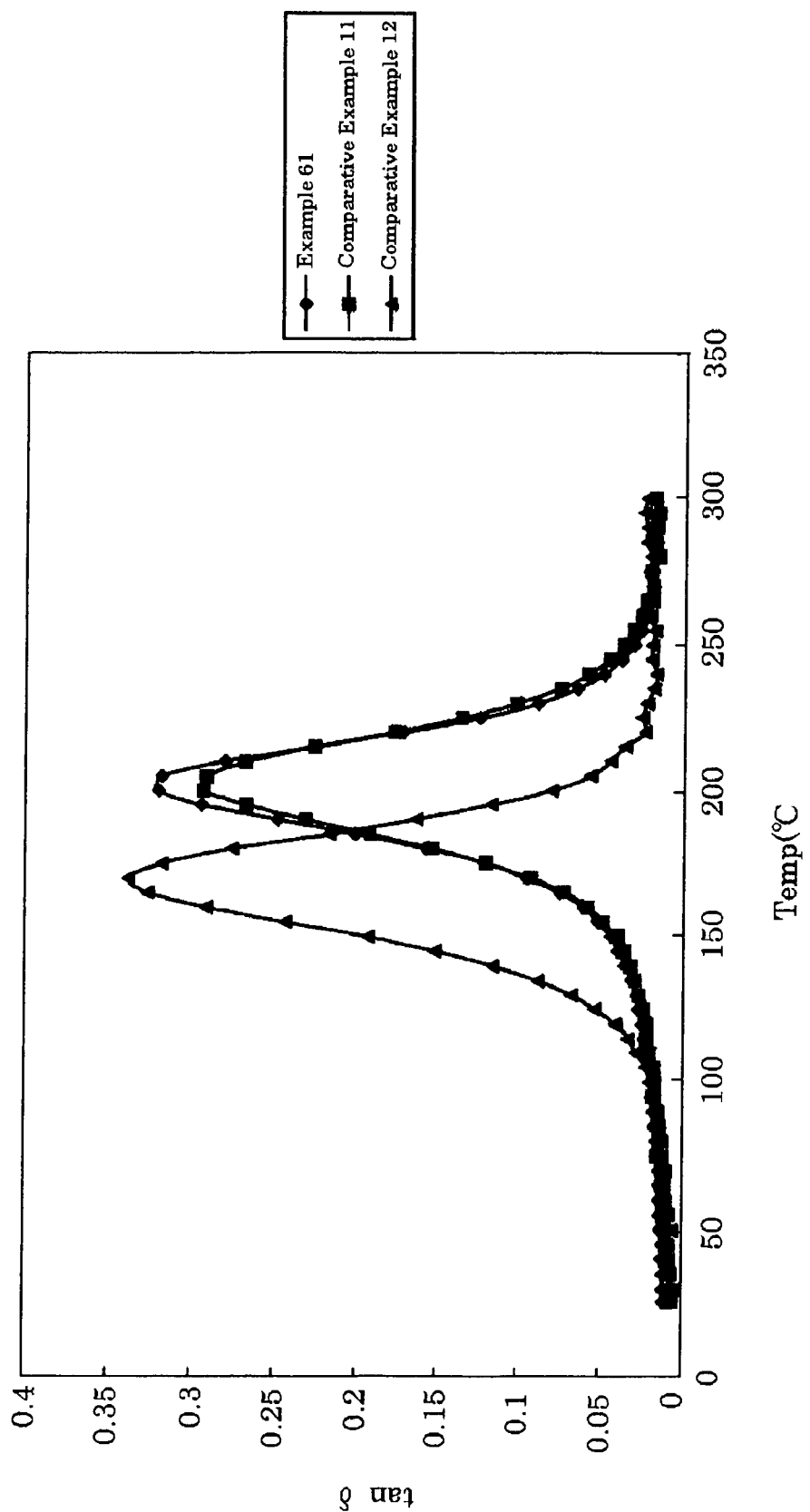
FIG. 14 is a rheometer measurement chart of an epoxy resin. In the drawings, 1 denotes a peak corresponding to a monomeric phenol and 2 denotes a peak corresponding to a dimeric phenol.

It is seen from the results of measurement by the rheometer of FIG. 14 that, when the behaviors of tan δ at the time of raising a temperature were compared, the test piece prepared from the epoxy resin of Example 67 had a Tg value (crosslinking density) equivalent to that of the test piece prepared from the epoxy resin of Comparative Example 11 having a large weight-average molecular weight and higher than that of the test piece prepared from the epoxy resin of Comparative Example 12 having the same weight-average molecular weight. Thus, it was confirmed that the cured matter of the epoxy resin produced of the novolak resin obtained by the present invention had a crosslinking density higher than that of the epoxy resin produced by Comparative Example 12 and equivalent to that of the epoxy resin produced by Comparative Example 11. But, the melt viscosity was half or less of that of the epoxy resin produced by Comparative Example 11 but higher than that of the epoxy resin produced by Comparative Example 12. In other words, it was confirmed that the content and a degree of dispersion of a monomeric phenol (unreacted bisphenol A) had an effect on the crosslinking density and melt viscosity.

TABLE 10

|  | Example 67 | Comp. Ex. 11 | Comp. Ex. 12 |
|---|---|---|---|
| Epoxy equivalent (g/eq) | 225.7 | 214.5 | 232.9 |
| Melt viscosity (Pa · s/180° C.) | 0.24 | 0.60 | 0.08 |
| Softening point (° C.) | 82.3 | 83.9 | 68.3 |
| Tg(° C.) | 205 | 205 | 170 |

INDUSTRIAL APPLICABILITY

According to the process for production of the present invention, the phenolic novolak with the contents and the degree of dispersion of the monomeric phenol and a dimeric phenol controlled can be obtained in high yield, and the production cost can be reduced substantially.

The reaction time can be reduced and the yield can be improved by additionally having a surface active agent during the heterogeneous reaction step, and the yield can be improved.

By conducting the heterogeneous reaction step under pressure of 0.03 to 1.50 MPa, the reaction time can be reduced, and a low-boiling solvent such as methanol can be used as a reaction cosolvent.

What is claimed is:

1. A process for production of a phenolic novolak, comprising:
   a step of conducting a heterogeneous reaction of a phenol and an aldehyde in the presence of a phosphoric acid and an unreactive oxygen-containing organic solvent as a reaction cosolvent,
   wherein the phosphoric acid is 25 parts by mass or more per 100 parts by mass of the phenol,
   wherein the reaction cosolvent is 5 to 200 parts by mass per 100 parts by mass of the phenol, and
   the heterogeneous reaction takes place between two liquid phases in a cloudy state caused by the mixing of an organic phase having the phenol as the main ingredient and a water phase having the phosphoric acid, the aldehyde and a reaction cosolvent as the main ingredients.

2. The process for production of a phenolic novolak according to claim 1, wherein the phosphoric acid is 50 to 100 parts by mass per 100 parts by mass of the phenol.

3. The process for production of a phenolic novolak according to claim 1, wherein the reaction cosolvent is at least one element selected from the group consisting of an alcohol, a polyalcohol-based ether, a cyclic ether, a polyalcohol-based ester, a ketone and a sulfoxide.

4. The process for production of a phenolic novolak according to claim 1, wherein 0.40 to 1.0 mol of the aldehyde is reacted with 1 mol of the phenol.

5. The process for production of a phenolic novolak according to claim 1, wherein a surface active agent is further present in the step.

6. The process for production of a phenolic novolak according to claim 1, wherein the heterogeneous reaction is conducted under pressure of 0.03 to 1.50 MPa.

* * * * *